United States Patent [19]

Blakeslee

[11] Patent Number: 6,061,731
[45] Date of Patent: May 9, 2000

[54] READ ONLY LINEAR STREAM BASED CACHE SYSTEM

[75] Inventor: Michael C. Blakeslee, Washington, D.C.

[73] Assignee: Thunderwave, Inc., Rockville, Md.

[*] Notice: This patent is subject to a terminal disclaimer.

[21] Appl. No.: 08/810,785

[22] Filed: Mar. 5, 1997

Related U.S. Application Data

[63] Continuation-in-part of application No. 08/354,133, Dec. 6, 1994, Pat. No. 5,623,699.

[51] Int. Cl.[7] .............................. G06F 13/38; G06F 15/17
[52] U.S. Cl. .......................................... 709/231; 711/138
[58] Field of Search ................................... 709/219, 212, 709/213, 215, 234, 231; 710/52; 345/508; 711/138

[56] References Cited

U.S. PATENT DOCUMENTS

| | | |
|---|---|---|
| 4,819,159 | 4/1989 | Shipley et al. . |
| 4,956,803 | 9/1990 | Tayler et al. .............................. 395/440 |
| 4,975,830 | 12/1990 | Gerpheide et al. . |
| 5,051,845 | 9/1991 | Gardner et al. ......................... 360/14.1 |
| 5,067,071 | 11/1991 | Schanin et al. .......................... 395/293 |
| 5,099,319 | 3/1992 | Esch et al. ................................... 348/9 |
| 5,136,691 | 8/1992 | Baror ....................................... 395/466 |
| 5,157,774 | 10/1992 | Culley ..................................... 395/466 |
| 5,163,131 | 11/1992 | Row et al. . |
| 5,172,413 | 12/1992 | Bradley et al. ........................... 380/20 |
| 5,187,793 | 2/1993 | Keith et al. .............................. 395/775 |
| 5,247,347 | 9/1993 | Litteral et al. .............................. 348/7 |
| 5,263,142 | 11/1993 | Watkins et al. .......................... 395/842 |
| 5,276,828 | 1/1994 | Dion . |
| 5,287,482 | 2/1994 | Arimilli et al. .......................... 395/457 |
| 5,287,507 | 2/1994 | Hamilton et al. ........................ 395/650 |
| 5,289,581 | 2/1994 | Berenguel et al. ...................... 395/440 |
| 5,323,393 | 6/1994 | Barrett et al. .......................... 370/85.8 |
| 5,325,488 | 6/1994 | Carteau et al. .......................... 395/821 |
| 5,341,483 | 8/1994 | Frank et al. ............................. 395/416 |
| 5,446,844 | 8/1995 | Steckler et al. ......................... 395/250 |
| 5,493,646 | 2/1996 | Gutlag et al. . |
| 5,623,699 | 4/1997 | Blakeslee ................................. 710/52 |

*Primary Examiner*—Mark H. Rinehart
*Attorney, Agent, or Firm*—Irah H. Donner; Pepper Hamilton LLP

[57] ABSTRACT

A read only linear stream based cache for a linear stream based cache system receives data including at least one of voice data, video data, image data and digital data, from a data source and transmits the video data to an application controlling a display for displaying the video data. The cache system includes an application memory storing first data, a cache memory, operatively connected to the application memory, and storing second data, and a data processor, operatively connected to the application and cache memories. The data processor controls the transmission of third data from the data source to the application via at least one of the application and cache memories responsive to an application file request. When the data processor determines that a sufficient amount of at least one of the first and second data is stored in at least one of the application and cache memories, respectively, the application accesses the first data in the application memory, and the data processor controls the transmission of the second data from the cache memory to the application memory, and the third data from the data source to the cache memory. In addition, when the data processor determines that the sufficient amount of at least one of the first and second data is not stored in at least one of the application and cache memories, respectively, the application accesses the first data in said application memory, and the data processor controls the transmission of the second data from the cache memory to the application memory, and the third data from the data source to the application memory.

32 Claims, 18 Drawing Sheets

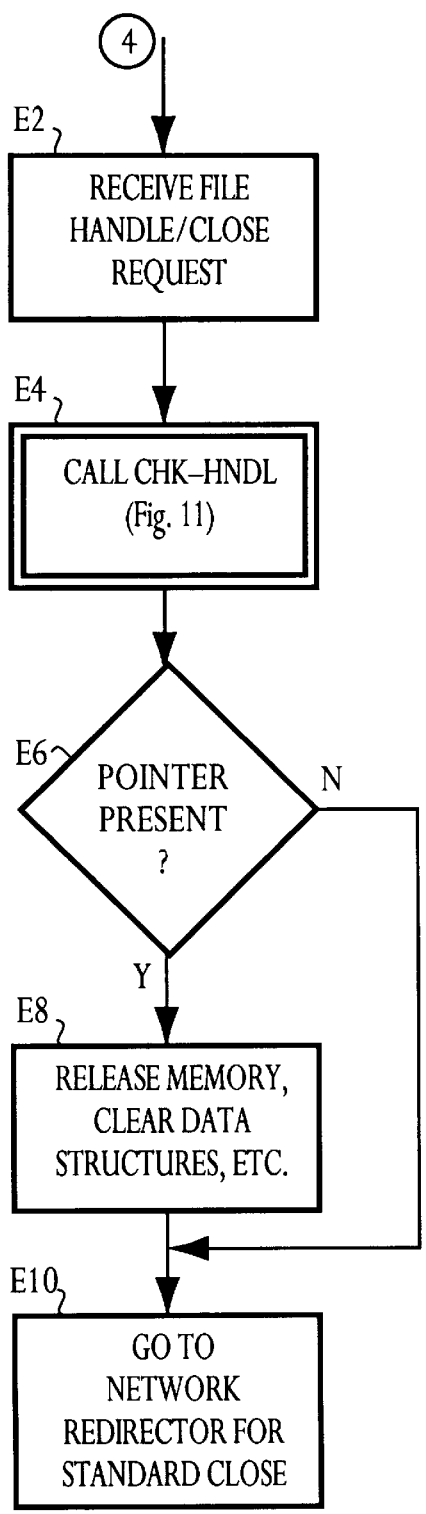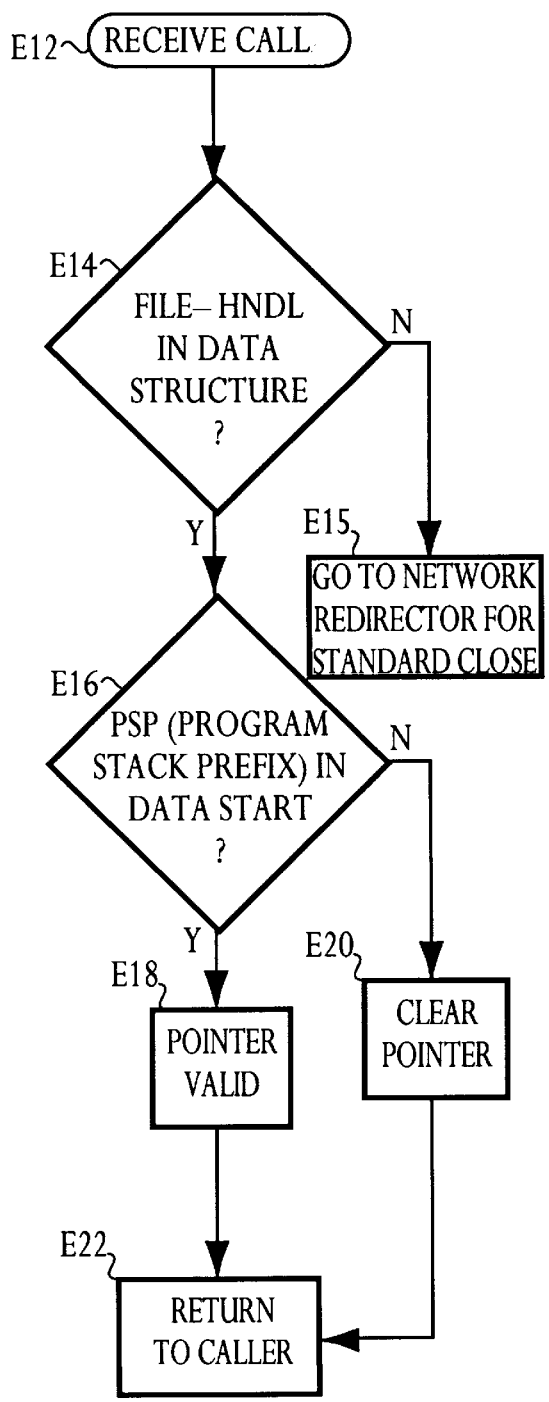
Fig. 8
Fig. 11

READ ONLY LINEAR STREAM BASED CACHE SYSTEM

RELATED APPLICATIONS

This application is a continuation-in-part application of U.S. patent application Ser. No. 08/354,133, filed on Dec. 6, 1994, now U.S. Pat. No. 5,623,699 and incorporated herein by reference.

BACKGROUND OF THE INVENTION

1. Field of the Invention

The invention relates generally to delivering data retrieved from an external storage. More particularly, the invention relates to a client playing data received from a file server via a network.

2. Background of the Related Art

In network systems, a client can comprise, for example, a hardware system 6 as generally shown in PRIOR ART FIG. 1. In the hardware system 6, random access memory (RAM) 30 stores operating systems including an application program 5, and various other programs (not shown), e.g. driver programs. Main processing unit 26 implements various processes which are stored in RAM 30.

Storage devices 8 are common devices used to store data which can be transferred to RAM 30. Interface mechanisms 32 comprise one or more of video display, speakers and a keyboard under control of a respective controller.

Input/output (I/O) 24 inputs and outputs data.

After a network server (not shown) receives a request for data which it has stored, the requested data is returned to the client via the network, and when the client requires additional data, another request is made and the data returned to the client. Such read request and return of data should occur within a time period which does not significantly reduce the quality of the particular end use for which the data files are being supplied.

The application program stored in a particular area of RAM 30 enables the system to request and receive video data via the network and to play the video data on the video display. In general, the video data is received via the network and transferred to the RAM memory 30 for playing the data on the video display. To play video data in an satisfactory manner requires the data to be delivered at a certain sustained data rate which is dependent on the specific implementation of the application program for playing the video. For example, assume that to satisfactorily play the video data requires 150 kilobytes a second and that a read request size of the network is 6 kilobytes. This would require 25 requests/second or a request every 40 milliseconds. However, networks are asynchronous in nature and a response to a request for data is dependent on many variables including contention (network use). Thus, for example, at one time a response to a request may require 10 milliseconds and at another time the response to a request may require 300 milliseconds. Given such variance, it is quite likely that there will be periods when the required quantity of video data is not delivered, resulting in the video data playing in an unsatisfactory manner.

Previously, one way of addressing the problem of insufficient delivery of video data has been to increase the size of the read request. However, increasing the size of the read request may "clog" the network channel with the response data stream at a specific point in time which is going to result in other clients having to wait longer. This does not result in an optimum use of the network. In addition, the increased size of the read request requires the application program to have sufficient RAM available to store the larger quantity of data which may not be the case. Still further, when the read request size is increased, the system must wait longer for transfer of the larger quantity data before it can start processing the data. This increase in wait time may result in the required amount of video data not being delivered to the video display, disrupting the playback.

Another way in which the problem of insufficient delivery of video data has been addressed is by using different compression techniques and/or "throttling data" (dropping frames). Throttling usually requires an increase in the raw data rate and server utilization, thereby acerbating the problem. However, these techniques require changes in the data stored by the server which is not always convenient. In addition, the quality of the playback may be adversely affected.

Another problem arises when a read request is made to the network from the application program for data.

Since the application program must wait for return of the data before it can issue another read request, the read requests are "blocked". However, the application program may have already determined the next data requirement during the wait interval, but cannot make the read request until the data from the preceding read request is returned. Thus, "blocking" of the read request may also result in the RAM having insufficient video data to provide satisfactorily playback.

SUMMARY OF THE INVENTION

The present invention is based on the realization and discovery that using the application read request to control the network read request is not an efficient way of transmitting continuous data requiring a high sustained rate of data delivery such as delivery of video data, time encoded data, time based data, and the like. While there are times in a network system when response to a read request may be so long as to result in the required data not being delivered when needed, there are many other times when a client could request data from the network, but does not as the application has not issued a read request. Therefore, if this "potential" for delivering data via the network can be harnessed so that the network delivers data, such as video data, image data, digital data, audio data, voice data, animation data, and the like (e.g., data having streaming, continuous, successive or continual like characteristics including time based data or time encoded data), to be stored by the client before being requested by the application and the application accesses this stored data as it is needed, efficiency can be greatly improved.

The present invention is also based on the discovery and realization that since video data (or continuous, time based, time encoded data and the like) is typically accessed in a forward, linear manner, further data requirements can be predicted.

The present invention is also based on the discovery that the prior art attempts at solving or improving the delivery of data, such as video data, from a network-based file server system to an application have ignored an important consideration. That is, the inventors are unaware of a prior art attempt at maximizing the efficiency and use of a cache memory to ensure that the required average transmission rate of data from the network to the application is achieved.

The present invention is further based on the discovery that prior art transmission methods have required the application to wait for the requested data from the network before any other application instructions can be processed. Accordingly, the inventors have discovered that the application essentially "locks-up" after posting a request to the network. This prevents additional application instructions from being processed, as well as preventing additional application data requests from being posted to the network. This period of time when the application is locked-up has been discovered to create significant inefficient use of the application memory.

It is a feature and an advantage of the present invention to improve delivery of continuous data including time based data, time encoded data, and the like, retrieved from an external storage.

It is another feature and advantage of the present invention to satisfactorily play back video data delivered via a network without increasing the size of the read request and "clogging" the network channel.

It is another feature and advantage of the present invention to efficiently manage video data in a manner which reduces the likelihood that application read requests will be blocked.

It is also a feature and advantage of the present invention to satisfactorily play back data, such as video data, delivered via a network by efficiently using a client system RAM.

To achieve these features and advantages of the present invention, a read only linear stream based cache system is provided for receiving video data from a network or other data source (such as a wireless data source) and transmitting the video data to an application controlling a display for displaying the video data. The cache system includes an application memory storing first data, a cache memory, operatively connected to the application memory, and storing second data, and a data processor, operatively connected to the application and cache memories. The data processor controls the transmission of third data from the network to the application via at least one of the application and cache memories responsive to an application file request. When the data processor determines that a sufficient amount of at least one of the first and second data is stored in at least one of the application and cache memories, respectively, the application accesses the first data in said application memory, and the data processor controls the transmission of the second data from the cache memory to the application memory, and the third data from the network to the cache memory. In addition, when the data processor determines that the sufficient amount of at least one of the first and second data is not stored in at least one of the application and cache memories, respectively, the application accesses the first data in said application memory, and the data processor controls the transmission of the second data from the cache memory to the application memory, and the third data from the network to the application memory.

In addition, a linear stream based cache system is provided which receives video data from a network or other data source and transmits the video data to an application controlling a display for displaying the video data. The cache system includes an application memory storing first data, a cache memory, operatively connected to the application memory, and storing second data, and a data processor, operatively connected to the application and cache memories. The data processor controls the transmission of third data from the network to the application via at least one of the application and cache memories responsive to an application file request including one of open, close and read requests. The data processor includes means for receiving the application file request from the application, means for requesting the third data from the network without waiting for a network response when a sufficient amount of at least one of the first and second data is stored in at least one of the application and cache memories, respectively, and means for requesting the third data from the network and waiting for the network response when the sufficient amount of at least one of the first and second data is not stored in at least one of the application and cache memories.

The present invention also provides a method of receiving video data from a network and transmitting the video data to an application controlling a display for displaying the video data. The method includes the steps of receiving an application file request from the application, and determining whether a sufficient amount of at least one of first and second data is stored in at least one of application and cache memories, respectively. The method then posts a request for third data from the network without waiting for a network response when the sufficient amount of data is stored, and processes a network response including the third data in response to the request posted. The method then controls transmission of the third data from the network to the cache memory, and from the cache memory to the application memory after the network response is processed.

Further, a method is provided for seeking in a video data file received from a network and transmitted to an application controlling a display for displaying the video data file. The method includes the steps of receiving a seek file request from the application, and determining whether the seek file request is one of relative to beginning of file, relative to end of file and relative to current position in the video data file. The method normalizes the seek file request with respect to a reference point in the video data file, and determines whether a sufficient amount of data is stored in at least one of application and cache memories. The method seeks to a new position in the video data file responsive to the seek request when sufficient amount of data is stored, and clears the at least one of application and cache memories and requesting additional data from the network for seeking to the new position in the video data file when sufficient amount of data is not stored.

BRIEF DESCRIPTION OF DRAWINGS

FIG. 4 is a block diagram illustrating the hardware and process flows between the cache system, the client system and the network.

FIGS. 6–16 are flow charts showing the operation of the cache system of the present invention.

DETAILED DESCRIPTION OF THE DRAWINGS

Figure 1:
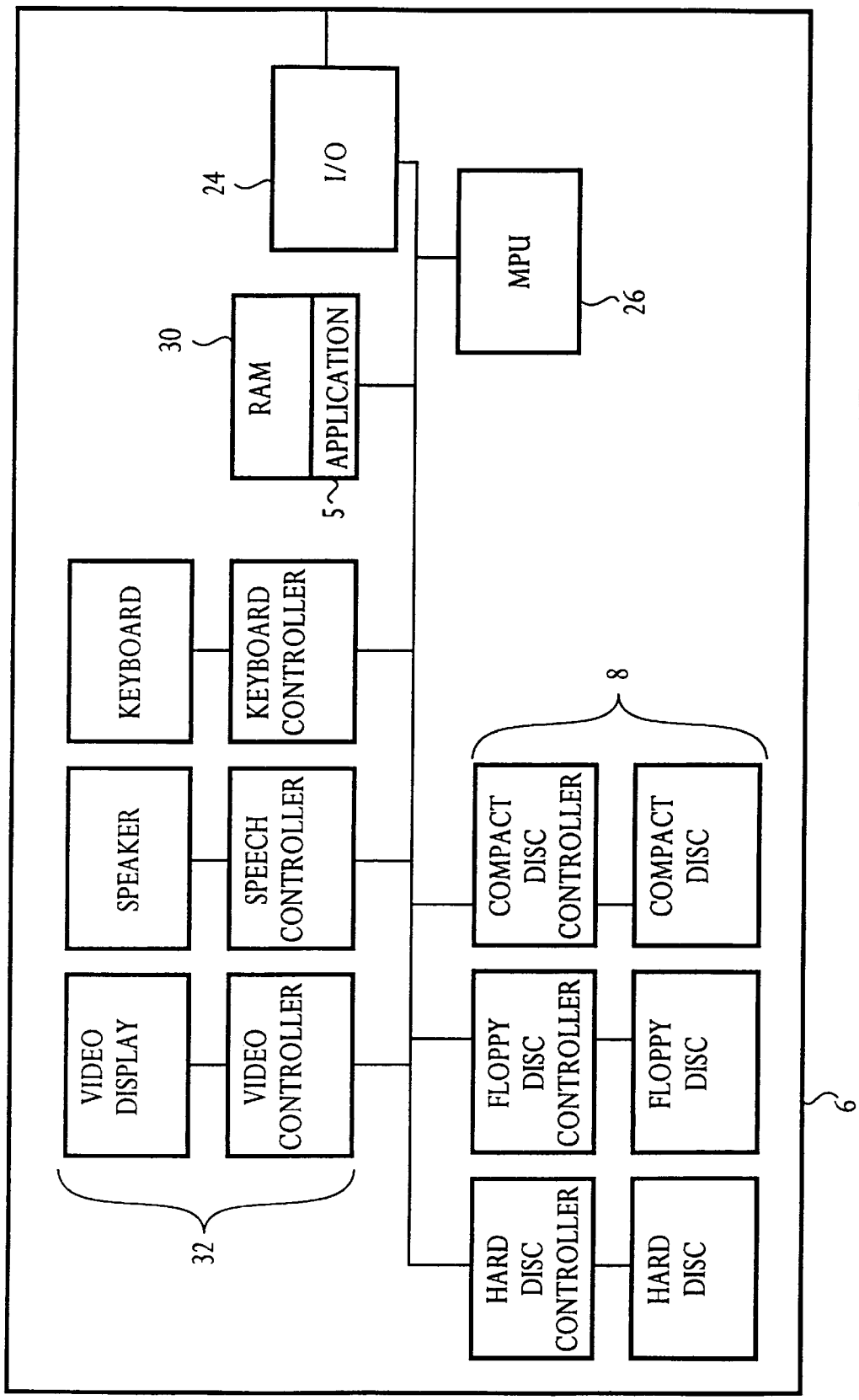
FIG. 1 is a block diagram showing a conventional client hardware system.
Figure 2:
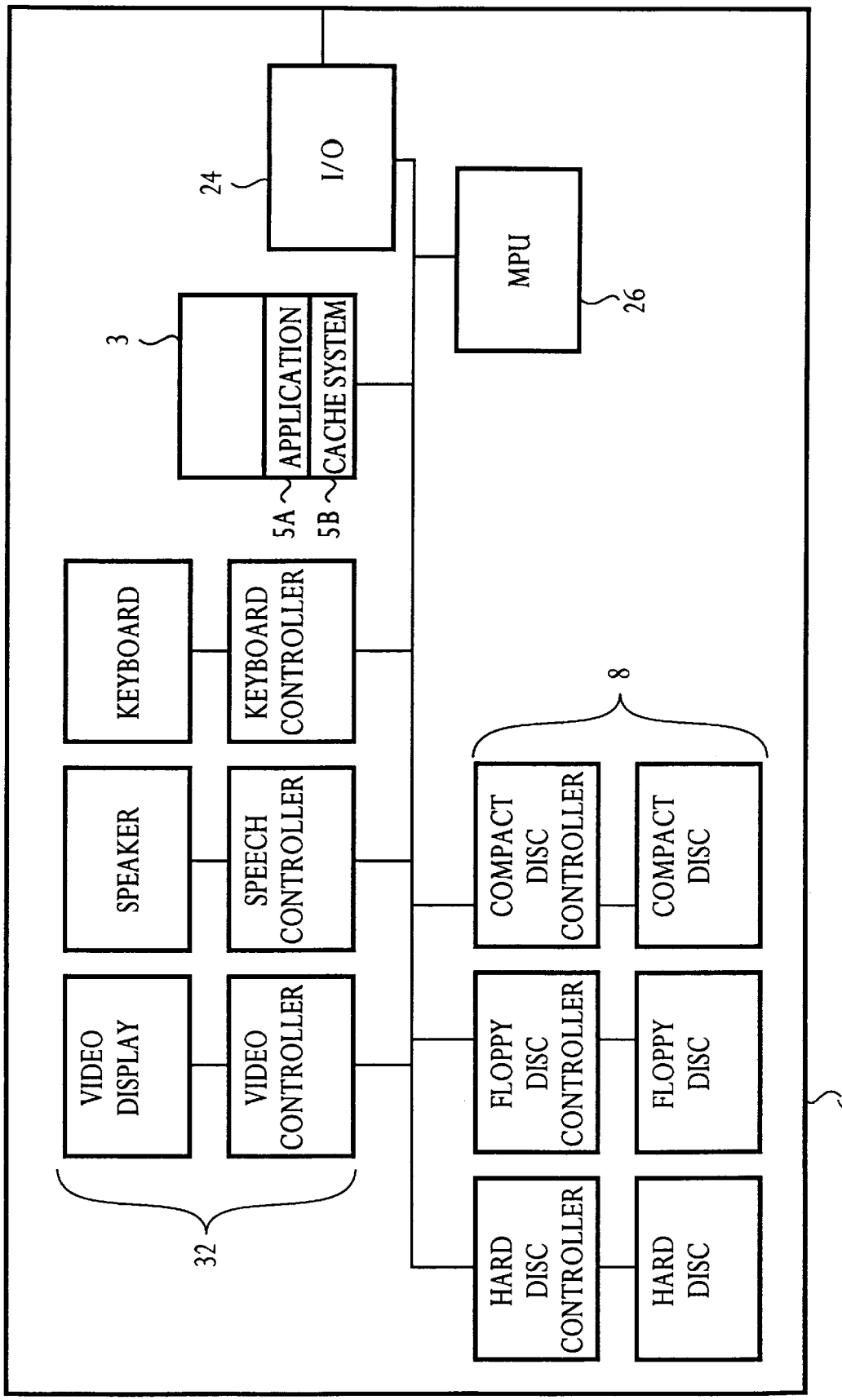
FIG. 2 is a block diagram showing a conventional client hardware system with the RAM modified to include the cache system of the present invention.

The client hardware system shown conceptually in FIG. 2 is similar to that of FIG. 1, with RAM 30 modified to include a cache system 5B. All other features of the client hardware system are the same. While FIG. 2 depicts the application 5A on top of the cache system 5B, the illustration is merely to indicate that the application 5A and the cache system 5B reside in independent areas of the RAM 3 of FIG. 2, not that one is stacked on top of another. It has been determined that a standard commercially available processor will be sufficient to perform the below described processing operations. For example, a standard 486 microprocessor, manufactured by Intel Corp., with about 2–4 mega bytes of random access memory has been utilized.

Figure 3:
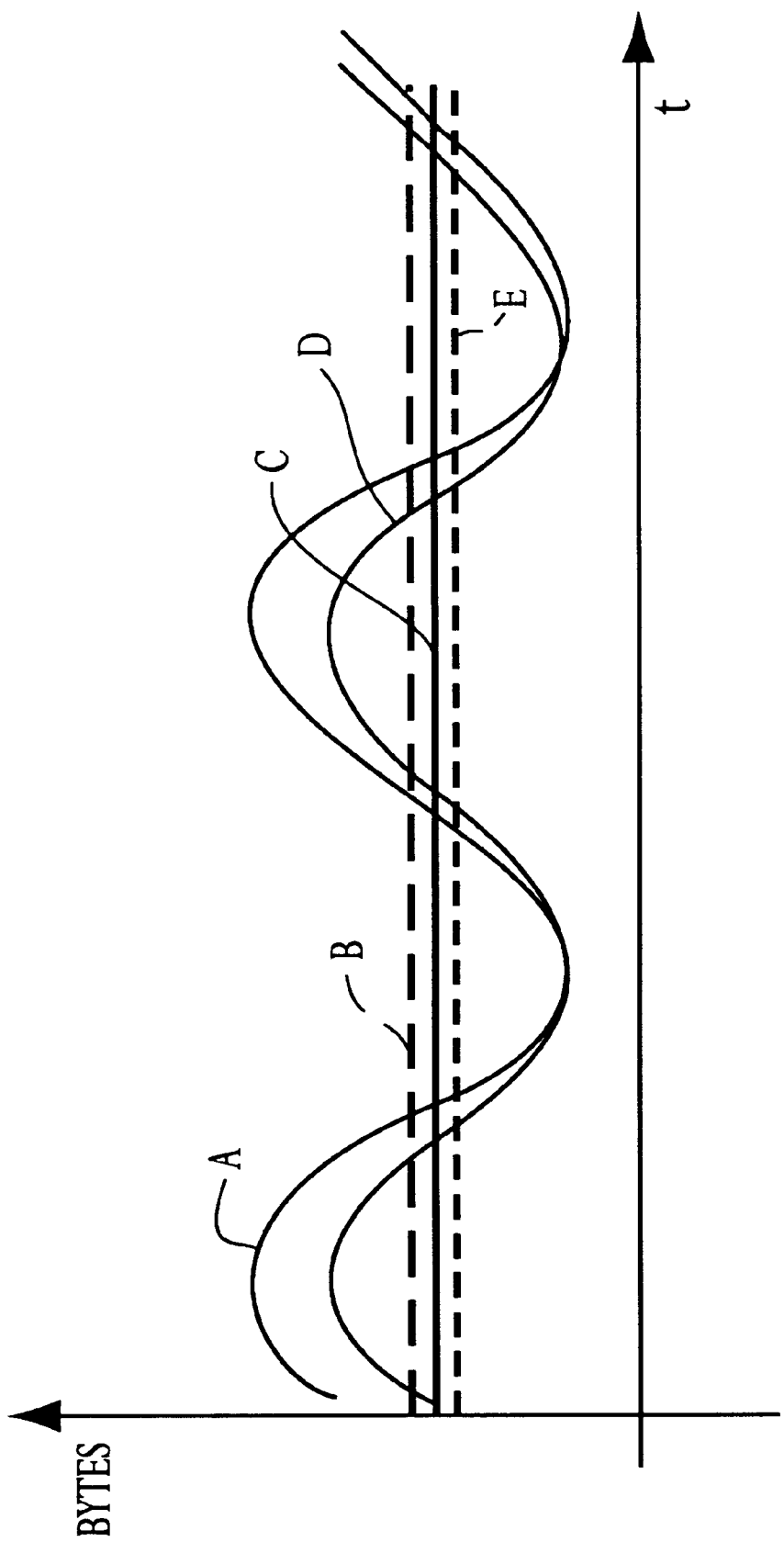
FIG. 3 is a graphical illustration showing examples of a continuous delivery rate of data to the read only linear stream based cache system of the present invention.

FIG. 3 is a graphical illustration showing examples of data delivery when a curve is drawn between the discrete deliveries to the read only linear stream based cache of the present invention. Curve A represents a delivery where the average delivery rate is line B. Curve D represents a delivery where the average delivery rate is line E. Line C represents the minimum required delivery. If the average delivery can be kept equal to or above the minimum required delivery as in curve A, the cache of the present invention will be able to supply data to the application so that satisfactory playback results. If the average delivery cannot be kept equal to or above the minimum required delivery as in the case of line E for curve D, the cache will be not able to supply sufficient data to the application so that disruptions in the playback are likely to result. However, it has been found that for most situations employing the cache system of the present invention, the average delivery can be kept equal to or above the minimum required delivery.

In FIG. 4, items in blocks 4A and 4B all reside within a client's system, and the components of block 4B are part of the cache system of the present invention. As time based or time encoded data, such as video data, is generally sequentially stored in the file server storage and must be played back in the same sequence, the cache system 25A includes a read only linear stream based cache where the read and write pointers scroll through the cache, and when they reach the end, they move to the beginning. The cache is generally read only since it is not generally required that data be written back.

An explanation of the process flow shown in FIG. 4 follows. When application 15A issues a file I/O request upon a selection request made by a user, a determination is made at 20A whether it is a regular file I/O request or a cached file I/O request. If it is a regular file I/O request, the network redirector 40A will determine whether local direct access storage 10A is to be accessed in response to the request or whether the request should be placed on the network or other data source, such as a data source which transmits data in a wireless environment. In this regard, the system works similar to systems which do not have the cache system of the present invention. Standard I/O requests can be made between the network redirector 40A and direct access storage 10A. One example of a standard cache interface is SMARTDRV manufactured by MICROSOFT Corporation. A second example of a standard cache interface is U.S. Pat. No. 5,289,581, incorporated herein by reference.

Once the requested file is retrieved, it is returned to the application 15A. Application 15A will receive the data from the network redirector 40A or from the cache system 25A and will transmit the data for display to the user. The data will preferably be transmitted, however, first to a standard decode mechanism, such as Indeo manufactured by Intel or Real Magic manufactured by Sigma Designs. These decoders are software and hardware based, respectively. The decoder will decode the compressed data and format the data for display on a monitor. In this manner application 15A controls the monitor to illuminate or display the appropriate information thereon.

If the request from application 15A is determined to be a cached file request, the cache of the cache system 25A is accessed and the data returned to application 15A. However, an important feature of the present invention is that the cache system 25A issues its own network I/O (input/output) requests independently of the I/O request issued from the application 15A. With this feature, the cache system 25A does not have to wait until the application 15A requests data in order to place a request for data on the network. Thus, the cache system 25A will make a network file request when it is determined that the cache can accept more data which will likely occur more often that the application 15A file request.

The size of the read only linear stream based cache is dependent on the particular network and application. It has been found in practical use that the cache need hold less than one second worth of video data. In a particular use, the cache may be 96K, but a system designer can routinely determine an efficient size of the cache dependent on the type of network and application.

Figure 4A:
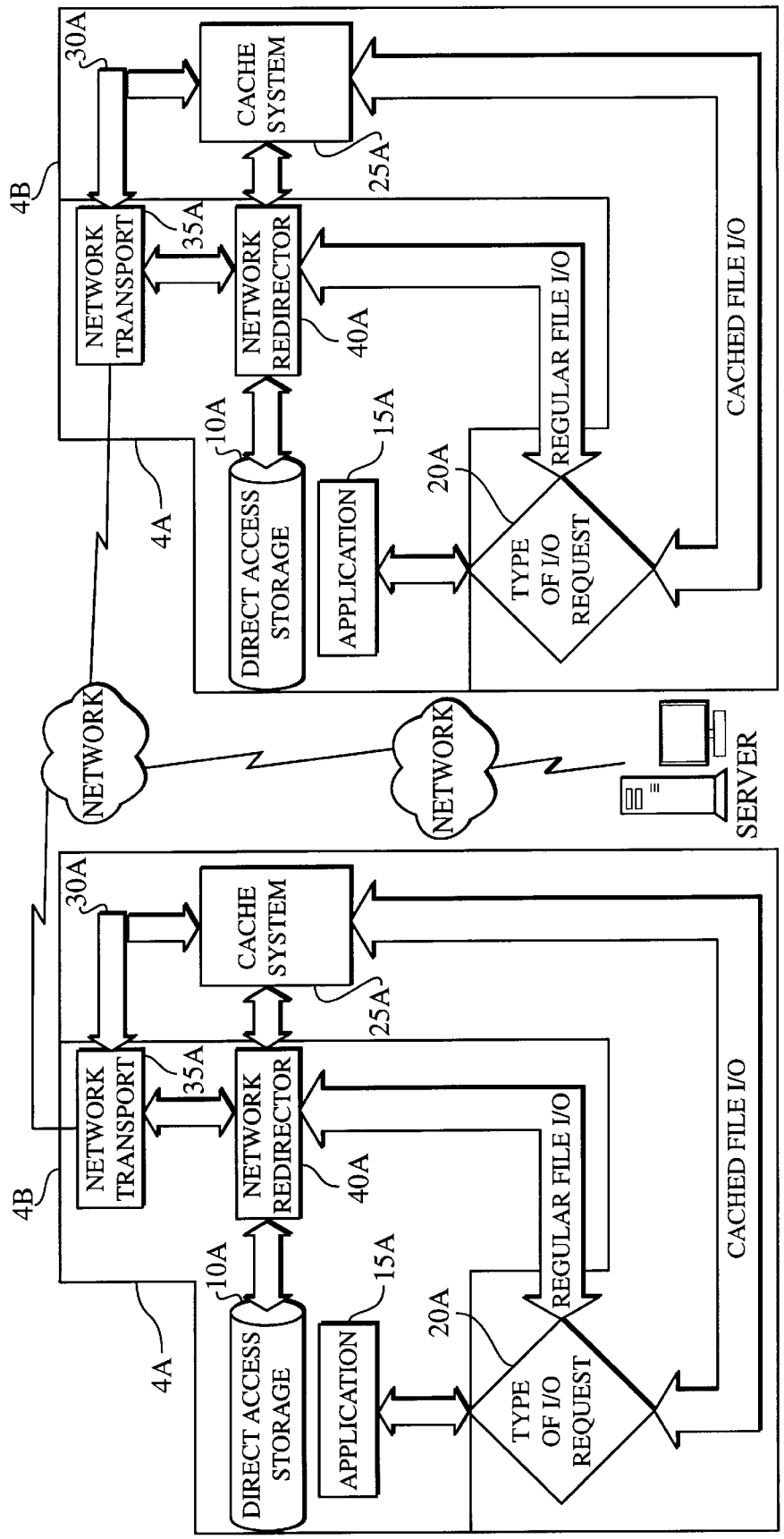
FIG. 4A is a block diagram illustrating the hardware and process flows between the cache system, the client system and the network in accordance with a second embodiment.

FIG. 4A is a block diagram illustrating the hardware and process flows between the cache system, the client system and the network in accordance with a second embodiment. In FIG. 4A, two client systems are illustrated. Each of the client systems are connected to a local or remote first network. The first network is connected to a file server network. The file server network interacts directly with the file server to retrieve the necessary information from it, and post the requests to it.

Figure 4B:
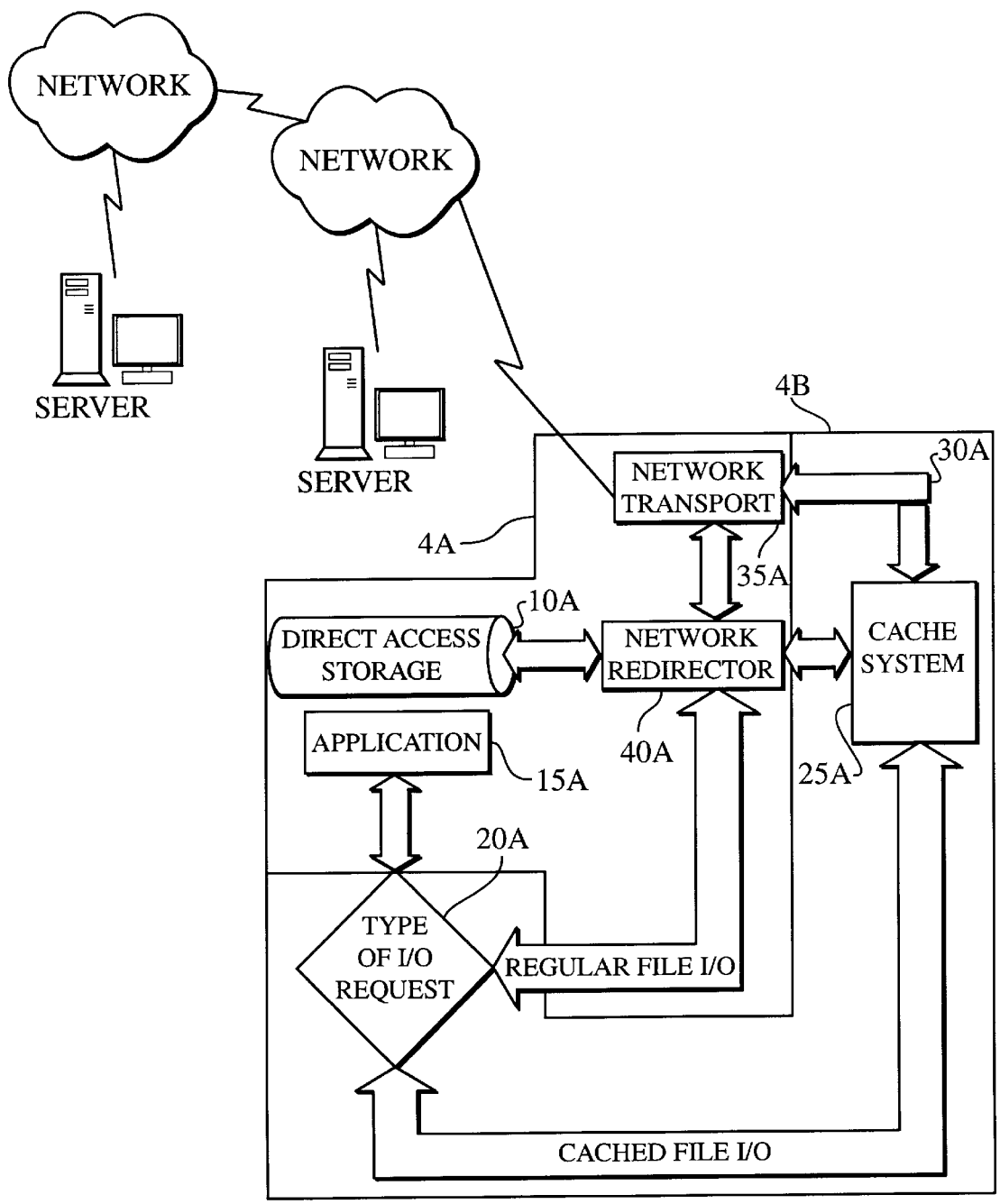
FIG. 4B is a block diagram illustrating the hardware and process flows between the cache system, the client system and the network in accordance with a third embodiment.

FIG. 4B is a block diagram illustrating the hardware and process flows between the cache system, the client system and the network in accordance with a third embodiment. In FIG. 4B, one client system is illustrated. The client system is connected to a local or remote first network with an associated file server. The first network is also connected to a second network with associated second file server. In the event the first file server does not contain the requested selection, the first network interacts with the second network to obtain the requested selection form the second file server, and to post the file requests to it for ultimate delivery to the client system.

Figure 5:
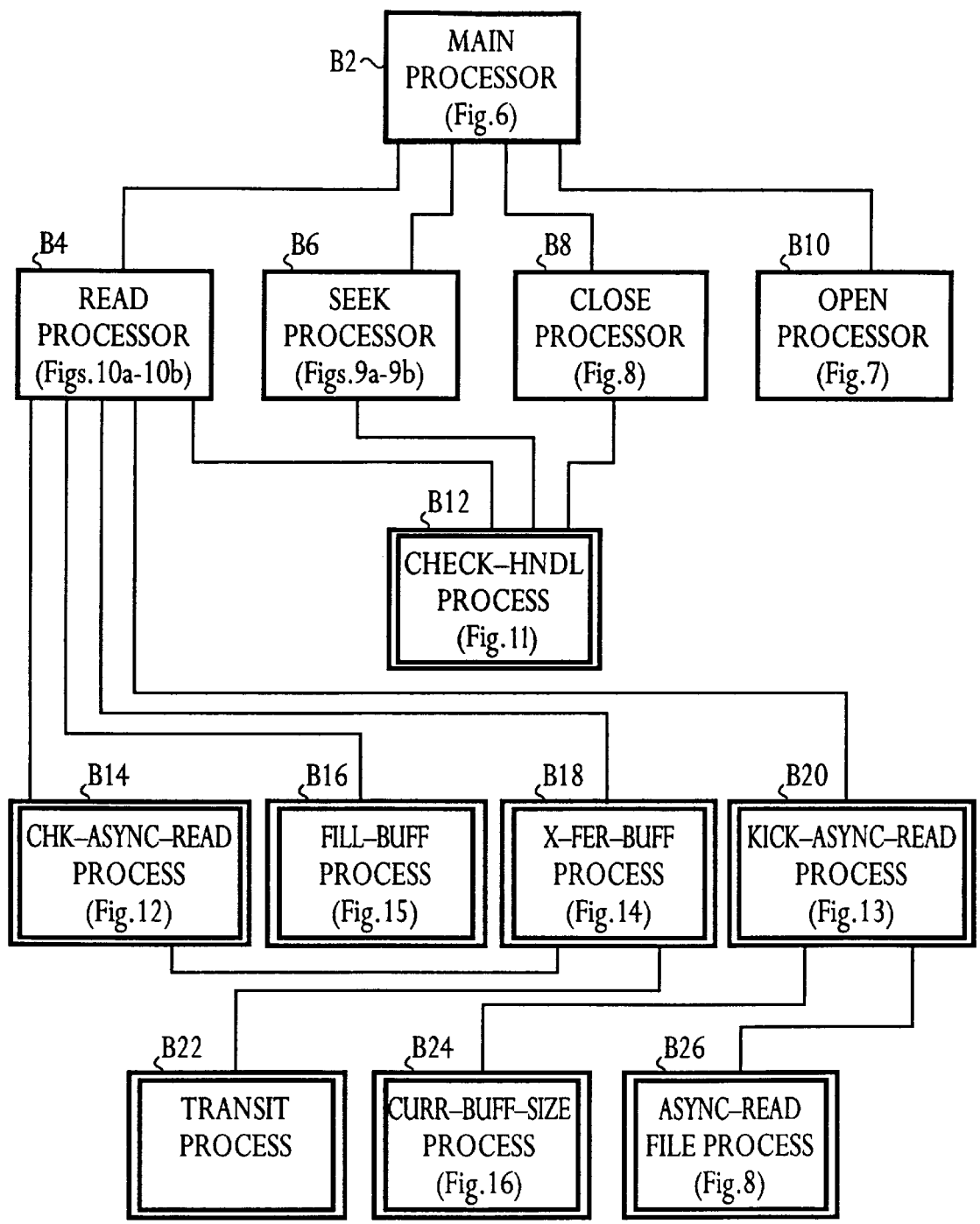
FIG. 5 is a block diagram illustrating the hardware and process flows of the cache system.

FIG. 5 is a block diagram of the hardware and process flows of the cache system in accordance with another embodiment of the invention. In FIG. 5, main processor B2 performs or implements the basic operations and control between the cache system 25A and the network. Main processor B2 determines whether a read, seek, close or open operation is being requested by the user via application 15A and directs control to read processor B4, seek processor B6, close processor B8 or open processor B10 in response thereto.

The typical order of directing control for a request received from the application 15A includes opening the network file via an open request executed by open processor B10, reading from the network file via a read request executed by read processor B4, and perhaps seeking in the forward or reverse direction in the network file with respect to data which is currently being stored by cache system 25A via a seek request executed by seek processor B6. After the reading and seeking operations are complete, the network file is closed via a close request executed by close processor B8. Each of the read processor B4, seek processor B6 and close processor B8 performs a check handle process B12 which determines or verifies that cache system 25A has the appropriate information, e.g., standard network handle information, for communicating with the network.

For implementing the read process by read processor B4, various additional processes are additionally implemented. Specifically, read processor B4 will initiate check asynchronous read process (chk-async-read) B14 which processes the outstanding network requests for cache system 25A. Read processor B4 also performs a kick asynchronous read process (kick-async-read) B20 which is utilized to fill the cache memory of cache system 25A by creating network requests for obtaining additional data without requiring application 15A to wait for the responses from the network. In order to perform this process, kick asynchronous read process B20 also utilizes current buffer size process (curr-buff-size) B24 which indicates the current size in the cache memory, as well as asynchronous read file process (async-read-file) B26 which posts the network read requests to the network.

Read processor B4 also performs a transfer buffer process (xfer-buff) B18 which transfers the data stored in the cache memory to the application memory (and vice versa) for access by application 15A. The transfer buffer process B18 also utilizes transit process B22 which processes the transfers of data between the application and cache memories. Finally, read processor B4 also performs a fill buffer process (fill-buff) B16 which is initiated when cache system 25A determines that both the application and cache memories are substantially empty creating an emergency or critical situation with respect to the availability of sufficient data to maintain the required average data transmission rate from the network to the monitor via application 15A. Fill buffer process B16 will then initiate read requests to the network and wait until the network responds with the data.

When the network responds with the data, fill buffer process B16 will first fill the application memory for immediate use by application 15A. Once the application memory is filled, fill buffer process B16 will next fill the cache memory in an attempt for cache system 25A to recover and continue processing the data using both the application and cache memories. In this manner, cache system 25A is able to maximize the use of the application and cache memories for most normal data transmissions between the network and application 15A. In addition, cache system 25A also has the advantage of temporarily not utilizing the cache memory but arranging for data transmissions between the network and the application memory directly. This permits cache system 25A to recover from unusually sporadic network transmissions resulting from network faults, unusually large traffic, etc. Each of these different processes for cache system 25A are discussed in greater detail below.

Figure 6:
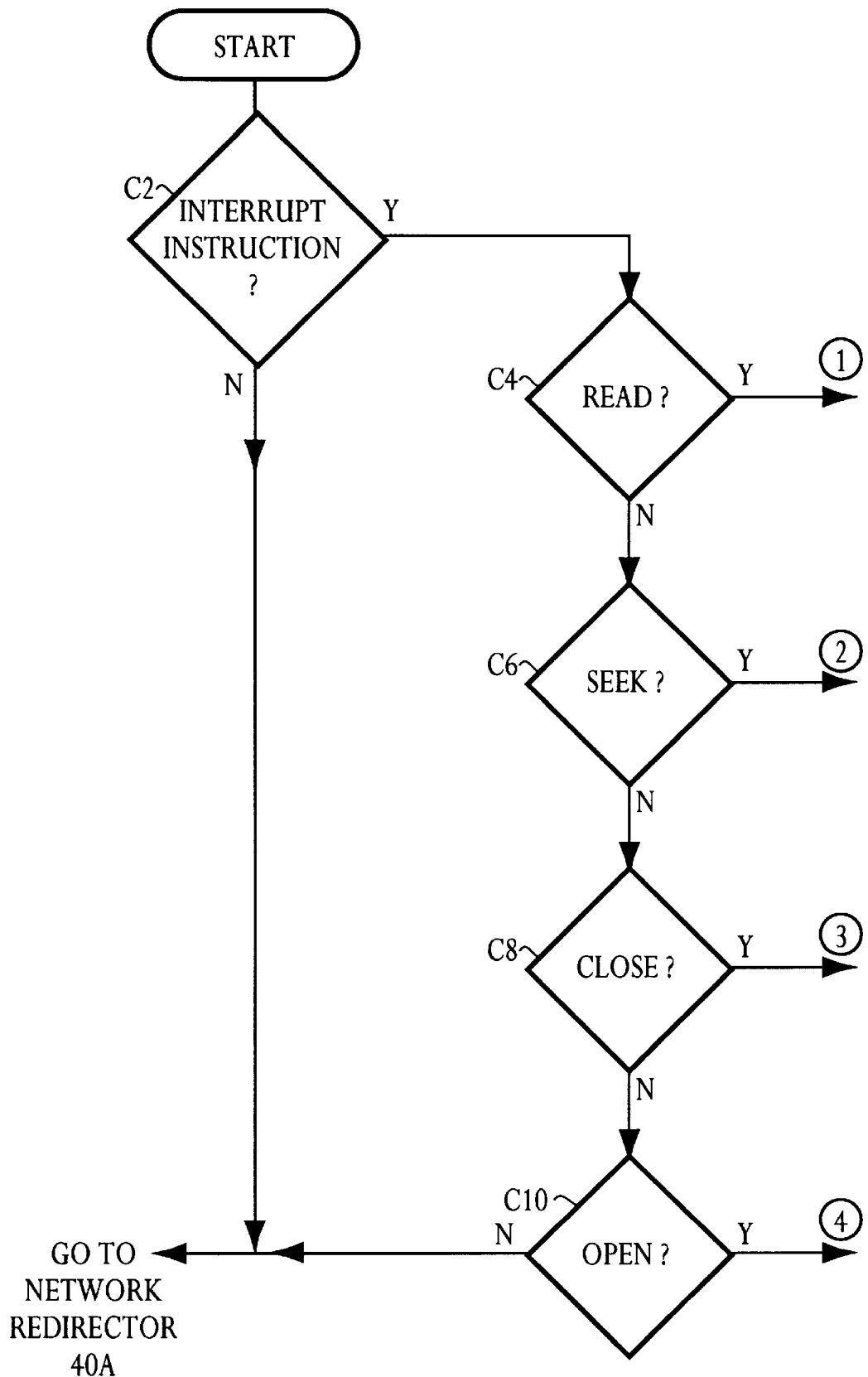

FIGS. 6–16 are flow charts showing the operation of the cache system of the present invention. FIG. 6 is a detailed flow chart of the processing of main processor B2. In FIG. 6, main processor B2 first determines whether an interrupt instruction or similar instruction which indicates that a potential or eligible request for data via cache system 25A is received from the user via application 15A has been made. If no such instruction is received indicating that a request has been issued, control of the message received from application 15A is directed to network redirector 40A for standard processing. For example, one such request may be a standard copy instruction which requests the client system to duplicate an existing file stored on direct access storage 10A. If, however, an instruction indicating that a video request is being made, steps C4, C6, C8 and C10 respectively determine whether the request from application 15A is a read, seek, close or open requests, in this particular order.

Advantageously, we have recognized and discovered that most of the application requests for a particular data file administered by cache system 25A will be read requests, and then seek requests. That is, for each data file to be transmitted via cache system 25A, application 15A will typically request the file to be opened, and to be closed once the entire file has been transmitted via a series of read requests from application 15A. Thus, the typical series of requests which application 15A will make for transmitting a data file will be first an open request, next a multitude of read requests for reading the data from the network to the monitor, perhaps several seek requests to move forward or reverse in the data file, and finally a close request to close the data file.

Since cache system 25A first determines whether the request is a read, then a seek, etc. as illustrated in FIG. 6, cache system 25A is able to significantly reduce the amount of unnecessary instructions which are being performed. Thus, by arranging or ordering the request determinations made by main processor B2 by frequency, the present invention is able to efficiently determine the type of outstanding request received from application 15A, while minimizing the amount of unnecessary determinations with respect to the type of application request. Assuming that it is determined in step C10 by cache system 25A that an open request is made, control is directed to open processor B10 described below.

Note that the various processors depicted in FIG. 5, i.e., main, read, seek, close and open processors, are generally depicted by main processing unit 26 in FIG. 2. Thus, according to this particular embodiment illustrated in FIG. 5, main processing unit 26 in FIG. 2 is actually a combination of specialized processors for performing specific tasks or functions as described in connection with FIG. 5. Alternatively, the various processors in FIG. 5 may also be sub-routines of a computer program. According to this alternative, main processing unit 26 would then implement or execute each of the different processing sub-routines in order to implement the process of the cache system.

Figure 7:
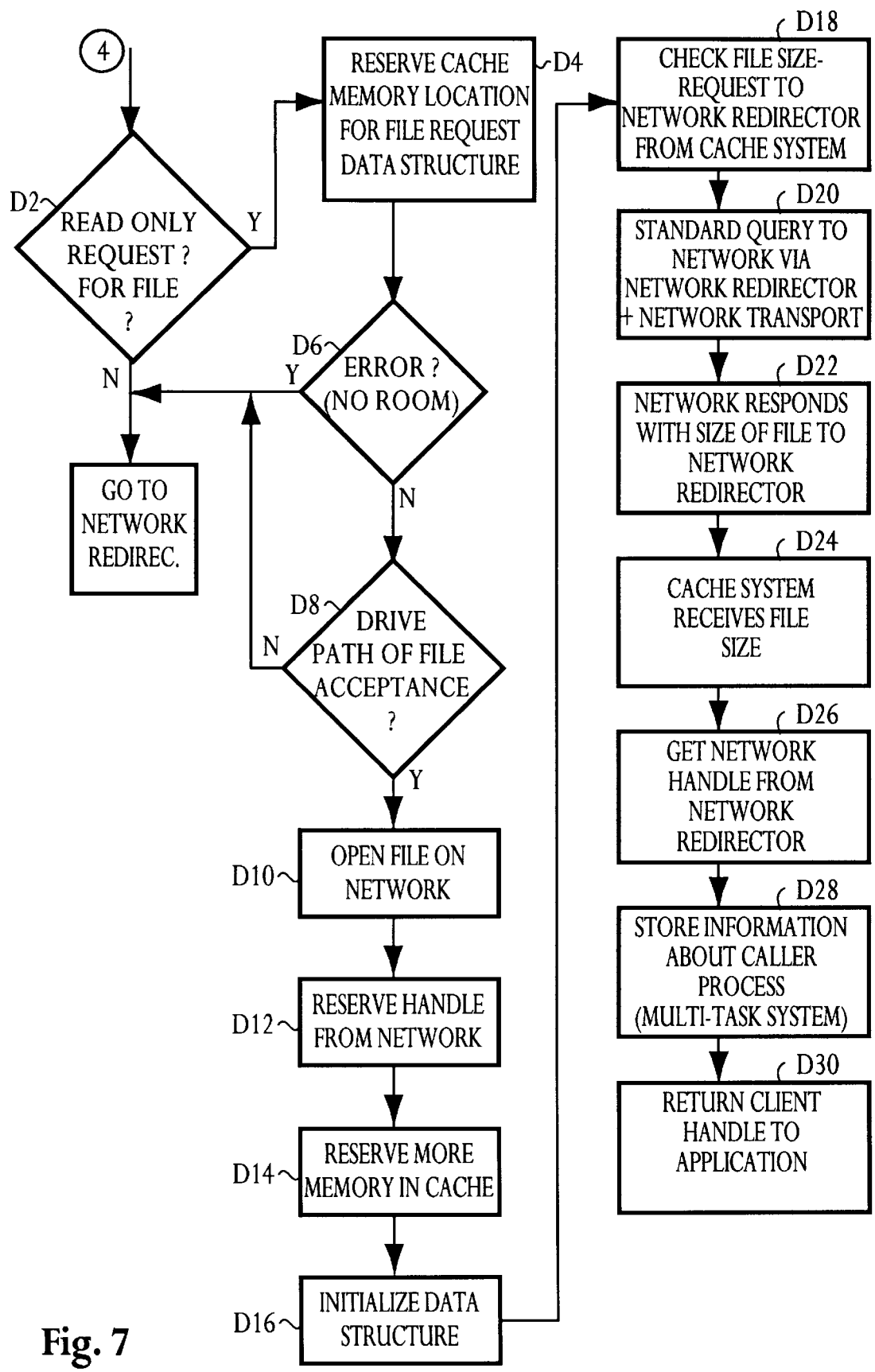

FIG. 7 is a detailed flow chart describing the process implemented by open processor B10. In FIG. 7, open processor B10 receives the application request from main processor B2 and determines whether the request is a read only request in step D2. If open processor B10 determines that the application request is not a read only request, then open processor B10 in cache system 25A will direct the application request to network redirector 40A for performing or processing a standard application request which is not handled by cache system 25A. If open processor B10 determines that the application request is a read only request, then open processor B10 will reserve a cache memory location for storing the standard data structure of the application request in step D4. Note that while the cache system 25A herein will only be implemented when the application request is a read only request, with slight modifications other application requests involving, for example, write requests to the network or data source, could also be serviced or processed by the cache system 25A. However, it was determined that for maximum benefit, only read only requests would be serviced by the cache memory system 25A since the significant benefits associated with cache system 25A are experienced mostly for read only requests from the network.

The typical data structure which is stored by open processor B10 in step D4 includes the operating system "handle" or designation for the client hardware system, the network file "handle" or designation, the memory location of the cache memory, the current read position in the file to be read, the current write position, the absolute write position, the unique program identifier such as the standard program segment prefix (PSP) in the MS-DOS environment, and the status of the file. Open processor B10 then determines whether or not the data structure was successfully reserved in step D6. If an error occurs, for instance, there is no room available for the data structure, then control is directed to network redirector 40A. If no error occurs in step D6, open processor B10 checks the drive path of the file which application 15A has requested to be opened in step D8. If the drive path is not determined to be acceptable for the cache system, e.g., the drive path indicates that the file is located on direct access storage 10A instead of the network, then control again is transferred to network redirector 40A for processing the application request.

If the drive path of the requested file is determined to be acceptable by open processor B10 in step D8, open processor B10 will request the network to open the file via network transport 35A. Assuming the network is able to successfully open the file, the network will respond and include its handle or identification information to network transport 35A which will then return the network response including the handle to open processor B10 in cache system 25A. Open processor B10 will then reserve additional cache memory in step D14 for the eventual receipt of data from the network. Open processor B10 will then initialize the data structure area reserved in the cache memory by erasing any remaining previous data structures in step D16.

Open processor B10 in the cache system then determines the file size for the open request by requesting network redirector 40A to query the network via network transport 35A. Network redirector 40A then queries the network using a standard network request to determine the file size in step D20. The network will then respond with the size of the file to network transport 35A which transmits the file size to network redirector 40A in step D22, and cache system 25A receives the file size from network redirector 40A in step D24. The file size is needed by the cache system 25A to transmit back to application 15A, as done under normal circumstances, so that the application 15A knows when the end of file has occurred for the particular file open request. Since the application 15A is able to identify the end of file status for the open request, application 15A will not make any additional and unnecessary requests once the end of file status is determined.

Open processor B10 then requests and obtains the network handle from network redirector 40A in step D26, and stores the network handle which includes information regarding the caller process for a multi-task system in step D28. Open processor B10 will then return the client handle to the application 15A in step D30 to allow application 15A to make the appropriate requests to the client system, such as an operating system, which is coordinating the operation of network read director 40A and cache system 25A in the client hardware system.

FIG. 8 is a detailed flow chart of the processing of close processor B8 in the cache system. In FIG. 8, close processor B8 implements the close routine when the application has determined that the requested file has been completely transmitted from cache system 25A to application 15A. Close processor B8 will receive the file handle included in the close request from application 15A in step E2. Close processor B8 will then call check handle sub-routine process (check-handl) B12 in step E4 which determines whether application 15A has requested to close a file which has been transmitted or administered via cache system 25A. The details of the check handle sub-process B12 will be discussed immediately below in connection with FIG. 11. Check handle process B12 will alter a pointer in the data structure previously stored in the cache memory which indicates whether or not the close request was for a file transmitted via cache system 25A.

Close processor B8 will next check the pointer in the data structure in step E6. If the pointer is present in the data structure, then the file was transmitted via cache system 25A, and close processor B8 will release the cache memory which it had previously reserved as well as clear any data structures which were used for transmitting the file from the network to application 15A in step E8. When close processor B8 has completed step E8, or when the pointer is not present in the data structure, control will then be returned to network redirector 40A to perform a standard close process of the file for the coordinating client hardware system, such as an operating system.

FIG. 11 is a detailed flow chart of the check handle process B12 which was called by close processor B8, and which is also called by read processor B4 and seek processor B6. In FIG. 11, check handle process B12 will receive a call from one of the read processor B4, seek processor B6, or close processor B8 in step E12. Check handle B12 will then refer to or access the data structure to determine whether or not a file handle has been previously stored in step E14. If no file handle has been stored in the data structure, check handle process B12 will then turn or transfer control to redirector 40A for a standard close of the file, since it is assumed that this file associated with the close request was not transmitted via cache system 25A.

If the file handle is in the data structure, check handle process B12 will then consult the data structure for a unique program identifier such as the standard program segment prefix (PSP) in the MS-DOS environment, which is utilized when cache system 25A is processing the application request in step E16. If the unique program identifier in step E16 is not present, the pointer in the data structure is cleared in step E20 by check handle process B12. If the unique program identifier is present in the data structure, the pointer is determined to be valid in step E18. After either step E18 or step E20 is performed, the check handle process B12 returns control to the calling processor in step E22.

Figure 9A:
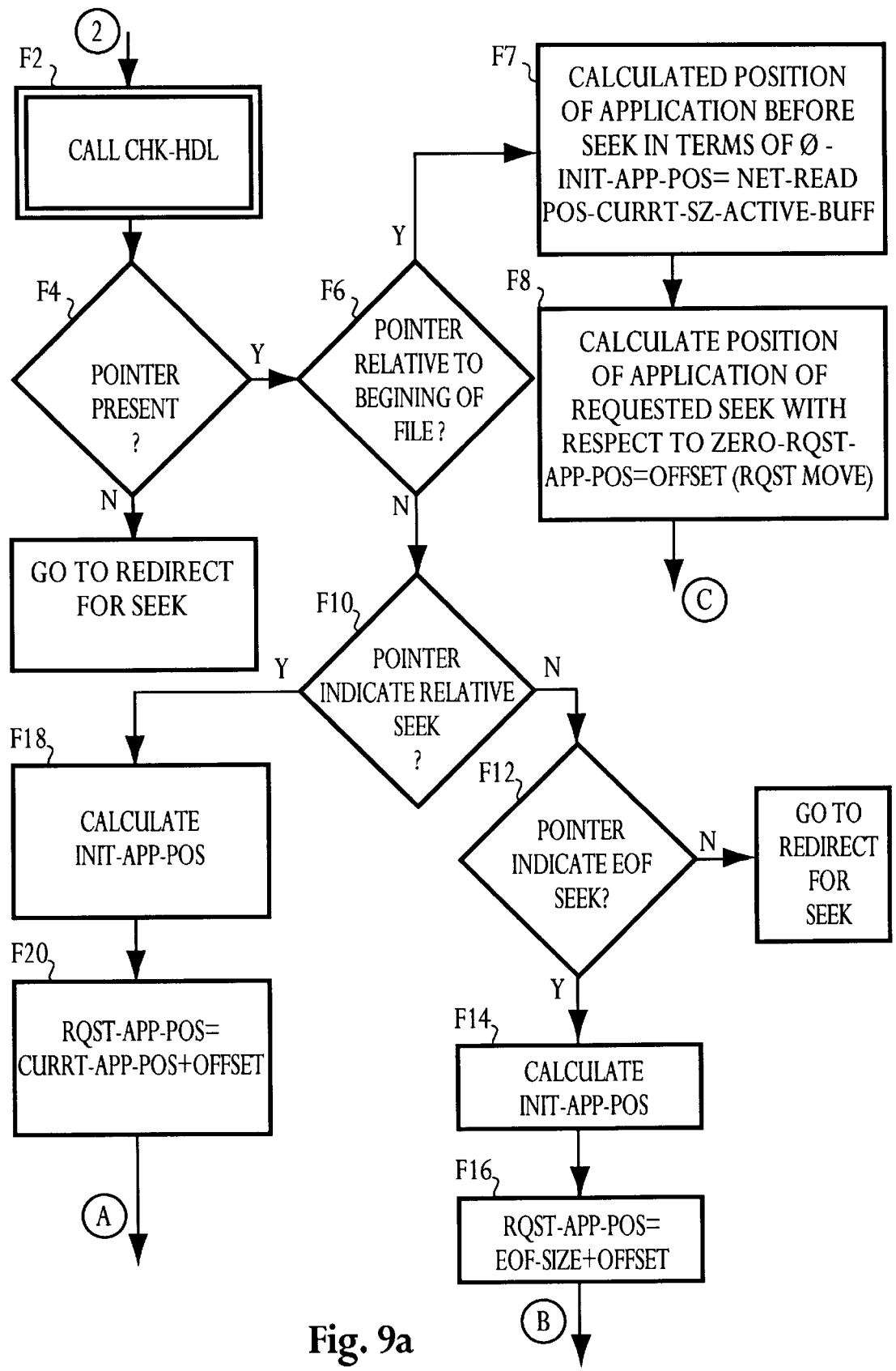
Figure 9B:
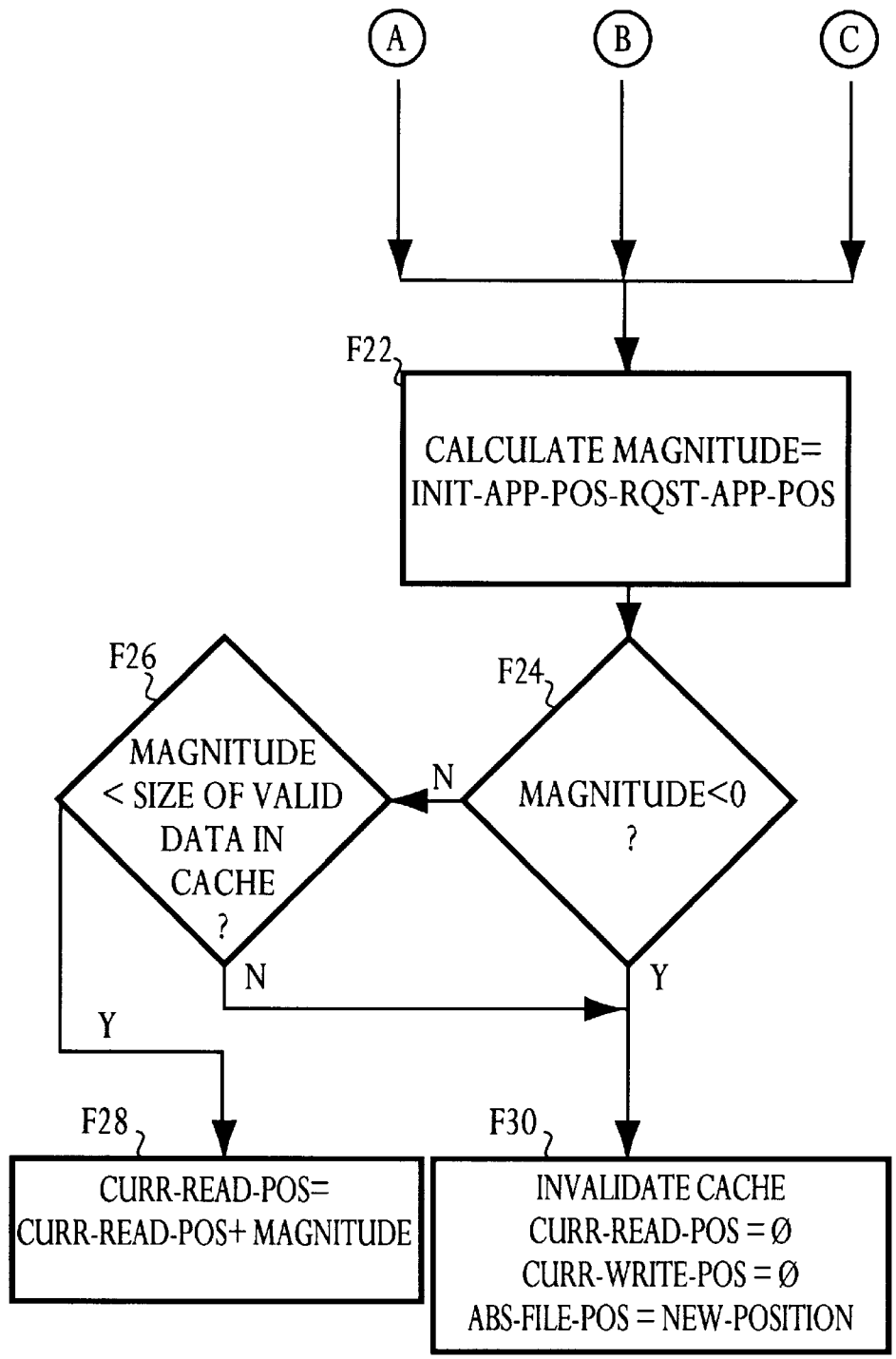

FIGS. 9a and 9b are detailed flow charts of the processing routine implemented by seek processor B6. In FIGS. 9a and 9b, cache system 25A receives a seek request from application 15A. Included in this seek request by application 15A is, of course, the file handle associated with the file for which the application has requested the seek operation to be performed. Seek processor B6 will then call check handle process B12 in step F2, and check handle process B12 will determine whether application 15A is requesting a seek of a file which is distributed via cache system 25A. If check handle process B12 determines that the seek request is for a file administered by cache system 25A, check handle process B12 will store a pointer in the data structure described previously (see FIG. 11).

Seek processor B6 will then determine whether the pointer is present in the data structure in step F4, and if no pointer is present, seek processor B6 will direct the seek request to network redirector 40A. If the pointer is present in the data structure, then seek processor B6 will determined whether the pointer which is stored in the data structure is relative to the beginning of the file in step F6. The pointer is essentially the new position which application 15A has requested to be read from the file which is administered via cache system 25A. As will be discussed immediately below, there is no single way of requesting a seek operation. The seek may be requested with respect to the beginning, end, or current position of the file which is being requested. Advantageously, cache system 25A detects and normalizes all of the different request formats to create a more efficient and effective method of seeking within the cache memory of cache system 25A. This normalization process is discussed in detail below.

If the pointer is determined to be relative to the beginning of the file in step F6, seek processor B6 will then calculate the application position in the file for the requested seek in terms of 0, i.e., the beginning of the file. In particular, this calculation is that the initial application position before the seek is equal to the network read position minus or less the current size in the active buffer or cache memory. Seek processor B6 will then calculate the position of the application for the requested seek with respect to 0 in step F8. This particular calculation sets the requested application position or new position after the seek equal to the offset or the actual move requested by the application 15A, since the application 15A has provided a seek request with respect to the beginning of the file, i.e., an absolute seek request.

If seek processor B6 determines that the pointer is not relative to beginning of file in step F6, then seek processor B6 will determine whether the pointer provided by application 15A is relative to the requested seek or current position in the file being read in step F10. If the pointer is relative to the seek, then seek processor B6 will calculate the initial position of the application before the seek in step F18 as described previously in connection with step F7. Seek processor B6 will then determine the position of the application after the seek in step F20 which is equal to the current position of the application plus the offset or the requested seek by the application.

If the new pointer provided by application 15A is not relative to the seek, seek processor B6 will then determine whether the pointer is relative to the end of the file in step F12. If the pointer is not relative to the end of file, then control will be transferred to network redirector 40A to perform any remaining seek operation which may be requested. If the pointer is relative to the end of file in step F12, seek processor B6 will then calculate the initial application position as described previously in step F14, and calculate the requested application position after the seek in step F16. When the pointer is relative to the end of file for the seek, the requested application position determined in step F16 equals the end of file size plus the offset or the actual requested seek by application 15A.

After either of steps F8, F16 or F20 are executed, seek processor B6 will then calculate the magnitude of the requested seek in step F22. The magnitude of the requested seek is determined by subtracting the initial application position from the requested application position. Advantageously, steps F61–F20 discussed previously, effectively normalize the pointer which is received by application 15A for the seek request. This normalization of the pointer provides significant advantages by providing seek processor B6 with the ability to handle various different types of seek requests from application 15A. Once the magnitude of the seek request is calculated in step F22, seek processor B6 determines whether the magnitude is less than 0 in step F24. If the magnitude of the seek request is less than 0 in step F24, then application 15A has essentially requested a negative or reverse seek which will place the request outside the current cache valid data area or storage. Accordingly, seek processor B6 will invalidate the current cache or clear any data which is currently in the cache to receive additional new data for the seek request in step F30.

In addition, seek processor B6 will also initialize the current read position and the current write position to 0 since there currently is no data in the cache for transfer to application 15A from cache system 25A. Seek processor B6 will also assign the absolute file position to be equal to the new position which is the current position added to the magnitude which is less than 0.

If it is determined that the magnitude of the seek is not less than 0 in step F24, seek processor B6 will then determine whether the magnitude is less than the size of the valid data in the cache memory of cache system 25A in step F26. If the magnitude is greater than the size of the valid data in the cache memory, then application 15A has requested a seek operation for data which is not currently in the cache memory, and seek processor B6 will invalidate the cache in step F30 as described previously. Accordingly, based on the new file position determined in step F30, the pointer will be repositioned so that additional data may be transferred to the cache memory in cache system 25A from the network for performing additional and subsequent requests, e.g., presumably read requests from the new position in the file.

If the magnitude of the read request is less than the size of the data in the cache memory in step F26, then the cache memory is currently storing data where the new pointer is to be positioned. Accordingly, seek processor B6 will reassign the current read position to be the current read position plus the magnitude in step F28, thereby bypassing or skipping any data which is between the position of the read before the seek and the current read position after the seek. Therefore, when seek processor B6 has transferred control from main processor B2, seek processor B6 will reposition the current pointer to a new pointer which may reposition the pointer to data currently in the cache memory of cache system 26A, or may invalidate and clear the cache memory and require additional data to be transferred from the network to the cache memory in cache system 25A to effectuate the requested seek.

Figure 10A:
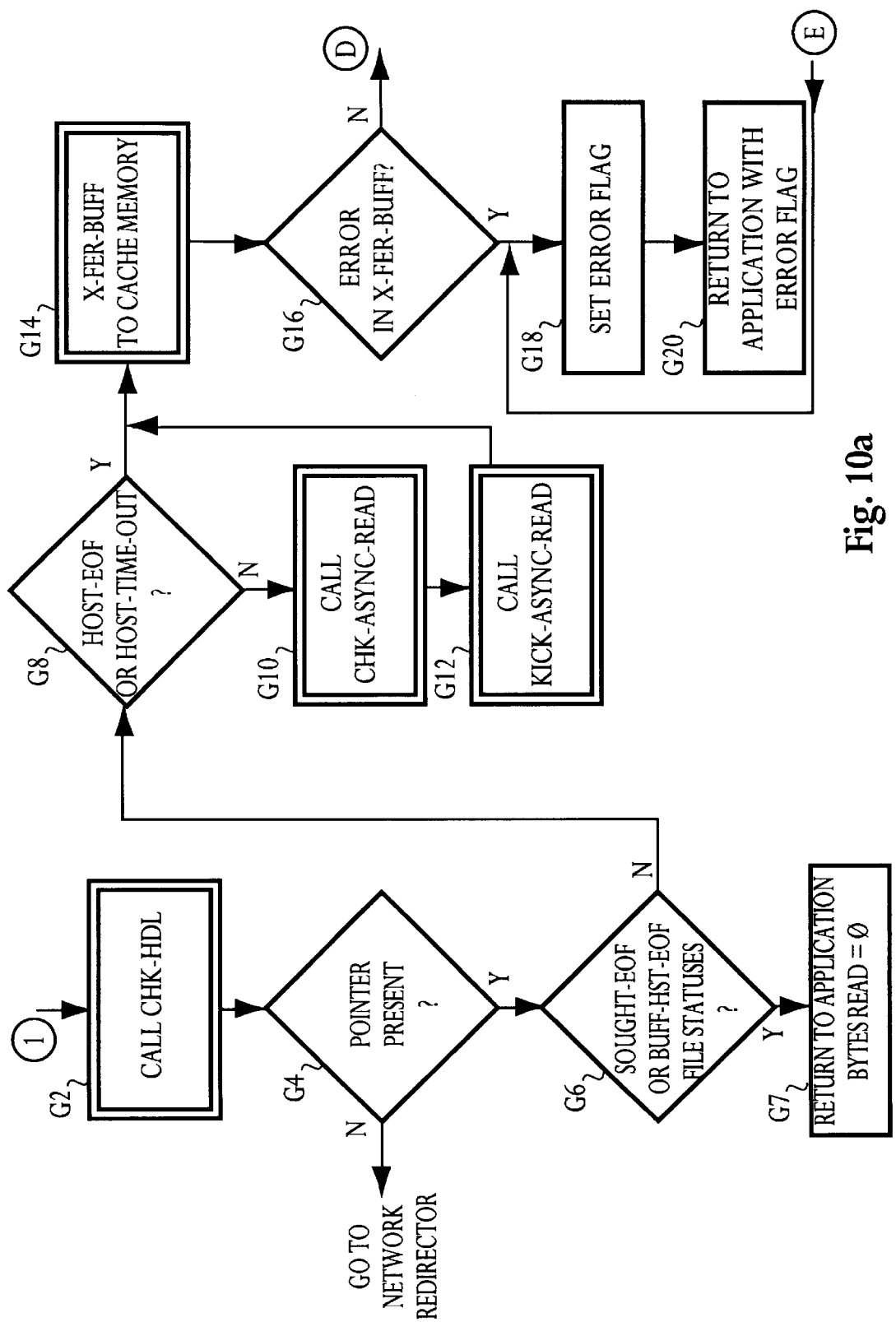
Figure 10B:
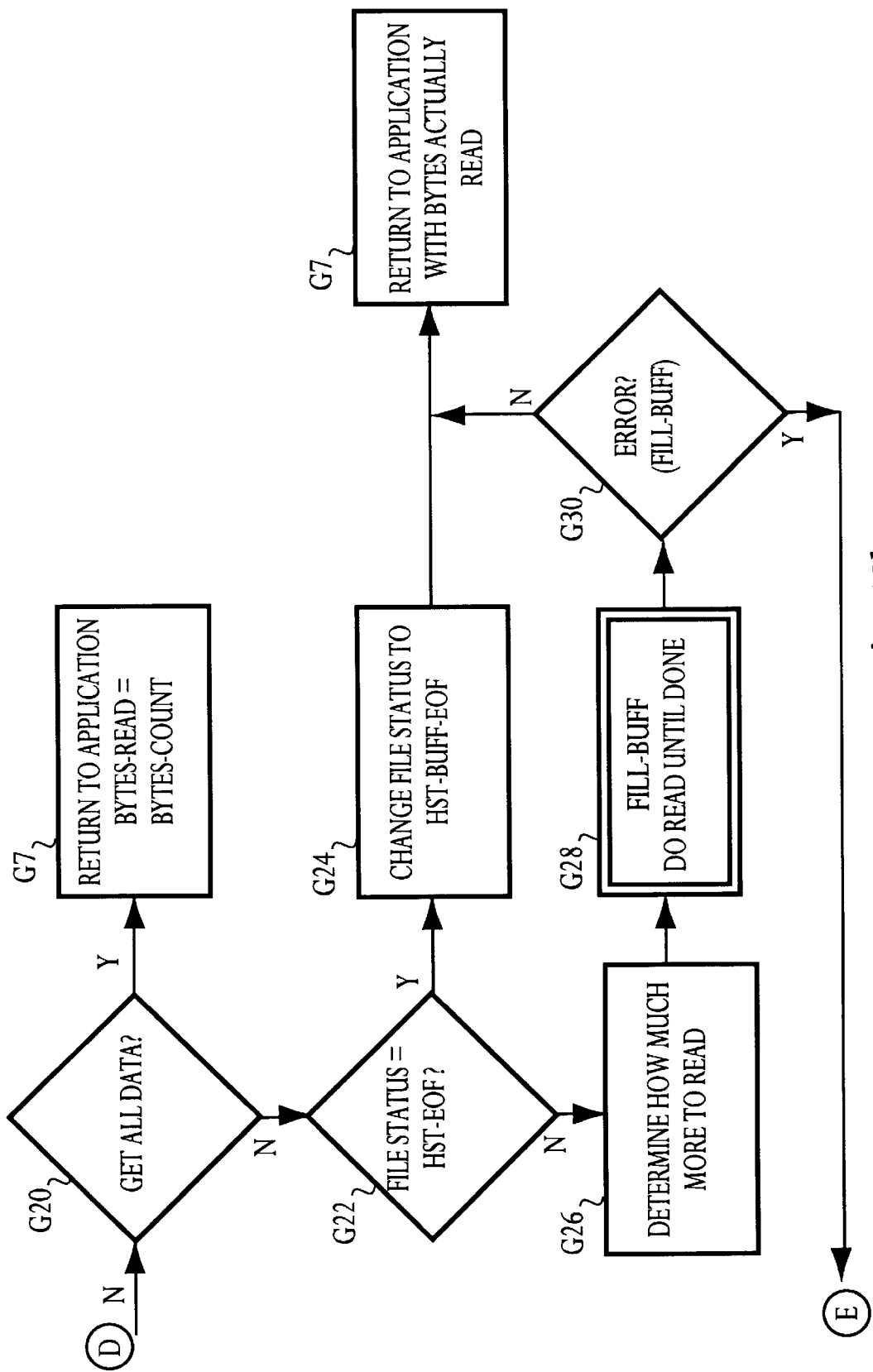

FIGS. 10a–10b are detailed flow charts of the process implemented by the read processor in the cache system. In FIGS. 19a–10b, read processor B4 receives the application request from application 15A via main processor B2. Included in the read request of application 15A is the total size of the file, and the file handle or identification of the file which application 15A has requested to be read at the current position in the file which is maintained by the cache system 25A. Read processor B4 will call check handle process B12 in step G2. Check handle process B12 has been previously discussed in connection with FIG. 11. Check handle process B12 will set a pointer in the data structure which has been previously reserved when the read request by application 15A is administered or delivered via cache system 25A.

Read processor B4 will then determine whether the pointer has been set in the data structure by the check handle process B12 in step G4, and if not, will redirect the read request to network redirector 40A for a standard non-cached network request via network transport 35A, if appropriate. If the pointer is determined to be present in step G4, read processor B4 will determine whether the read request has been previously completed, i.e., whether either the application has requested a read which is the end of the file or the cache memory in cache system 25A has completed transmitting the data to application 15A via the application memory in step G6.

If all the data has been transmitted to application 15A, then read processor B4 returns to application 15A a byte count of zero (0) in step G7 indicating that no additional data is to be transmitted to application 15A. If there is additional data to be transmitted by the cache memory in cache system 25A determined in step G6, then read processor B4 determines whether a host end of file status or a host time out status has been received by the network in step G8. The host end of status indicates that the network has completed all data transmissions for the particular file, and a host time out status indicates that the network cannot be currently requested or polled for any additional data.

If an additional read request can be made to the network, read processor B4 will then call the check asynchronous read process B14 in step G10. Check asynchronous read process B14 processes any outstanding network responses to previously posted network requests to receive the file data transmitted by the network, and transfers the data into the cache memory. Therefore, check asynchronous read process B14 does not interfere with the application memory, and application 15A can still access the file data which has been transferred to the application memory either via the cache memory or directly from the network, as will be discussed in greater detail below. In accordance with this arrangement, application 15A will continue processing data received from the application memory while check asynchronous read process B14 processes data received from the network to be transmitted to the cache memory of cache system 25A. Accordingly, this arrangement provides or allows additional data to be received from the network while application 15A is processing data accessed via the application memory.

After check asynchronous read process B14 is performed, read processor B4 calls kick asynchronous read process B20 in step G12. Kick asynchronous read process B20 is used to coordinate the posting of read requests from cache system 25A to the network via network transport 35A which are subsequently processed at a later time by check asynchronous read process B14. After the kick asynchronous read process B20 has processed an additional read request to the network in step G12, or if there is no additional data to be requested or processed from the network in step G8, read processor B4 then calls transfer buffer process (xfer-buff) B18 in step G14. Transfer buffer process B18 is used at this stage of the read process to transfer data which is in the cache memory to the application memory for access by application 15A. After step G14, read processor B4 determines whether an error was encountered by the transfer buffer process B18 which would prevent data being transferred from the cache memory to the application memory in step G16. If an error has occurred, read processor B4 sets an error flag in step G18 and returns to the application 15A with the error flag.

If no error has been encountered by transfer buffer process B18 in step G16, read processor B4 determines whether all the data was transferred from the cache memory to the application memory per the read request from application 15A. If all the data was transferred to the application memory, then read processor B4 returns to application 15A the number of bytes read which is generally equal to the byte count requested. If all the data was not transmitted to satisfy the application request in step G20, the read processor B4 determines whether the network has transmitted a file status of end of file in step G22. If the network has completed sending all the information and there is no additional information to be transmitted from the network to cache system 25A, then the read processor B4 changes the cache memory file status to buffer host end of file indicating that no additional data can be read from the network or "host" for the particular read request received from application 15A in step G24. Read processor B4 then returns to application 15A with the bytes read as being equal to the actual read data from the file.

If the network file status indicates that additional data needs to be read from the network in step G22, then read processor B4 determines how much additional data is required to be read to satisfy the read request in step G26. In this situation, the cache memory has been emptied and the application memory may be reaching a critical situation. Accordingly, read processor B4 then calls fill buffer process (fill-buff) B16 for filling or transmitting data from the network to both the application and cache memories. Fill buffer process B16 will then fill first the application memory and then the cache memory using the standard network read requests which prevents any additional read request from being posted to the network until the current read request has been fulfilled or completed by the network. Thus, fill buffer process B16 is used in emergency situations to fill the application and cache memories immediately. If fill buffer process B16 is determined to be successful in step G30, then read process B4 returns to application 15A with the bytes actually read for the particular request. If, however, an error is detected in step G30, control is directed back to step G18 which sets an error flag and returns to application 15A the error. This completes the general read routine implemented by read processor B4. Each of the subprocesses are now described below.

Figure 12:
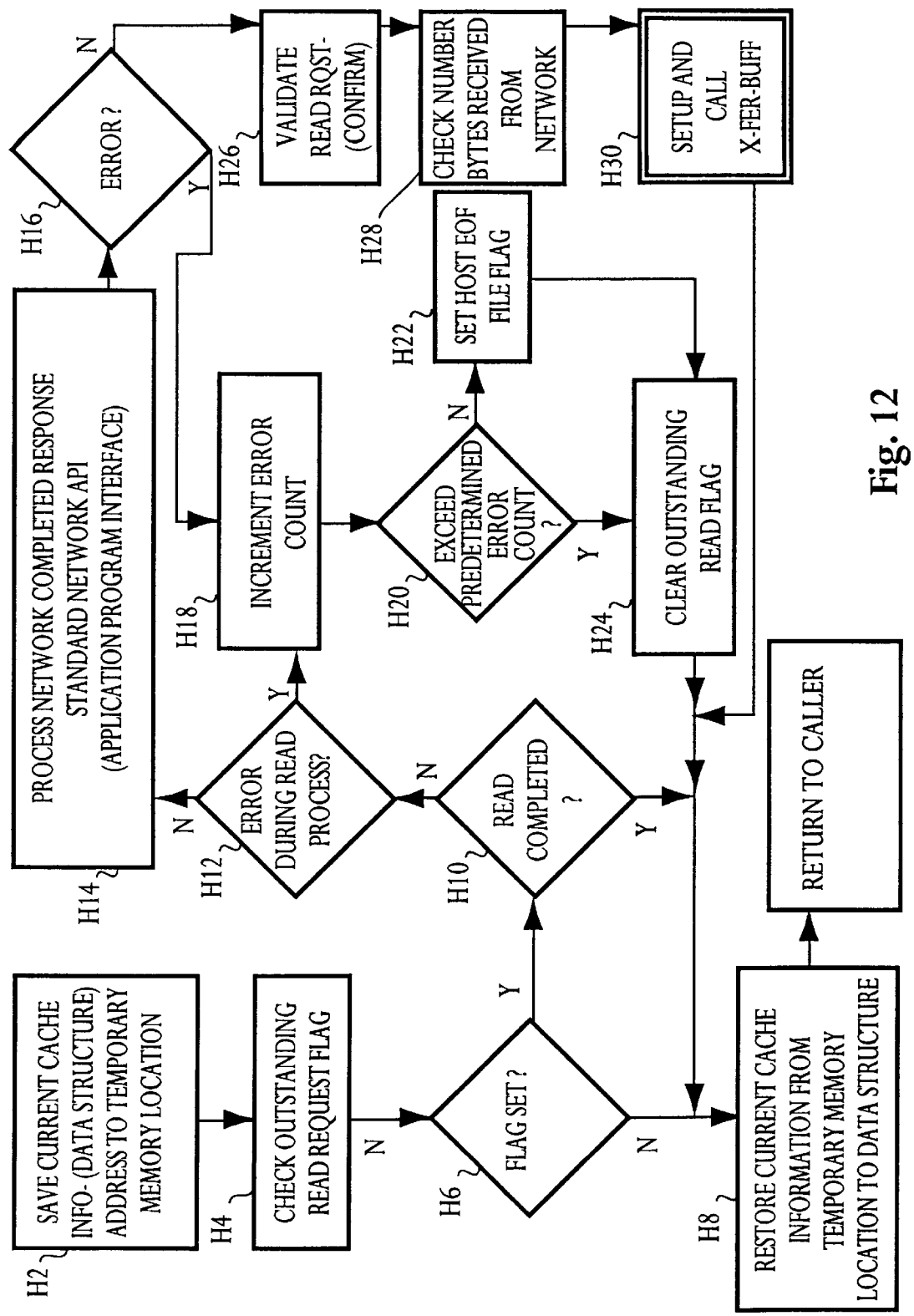

FIG. 12 is a detailed flow chart of the check asynchronous read process (chk-async-read) B14 which processes any outstanding network responses while permitting cache system 25A to post additional read requests to the network. In FIG. 12, check asynchronous read process B14 first saves the current cache information data structure to a temporary memory location in step H2, and then checks the outstanding read request flag in step H4 to determine whether the network has processed an outstanding read request which is ready for processing to transmit the file data to the cache memory of cache system 25A. If it is determined in step H6 that the read request flag is not set, the current cache information will be restored from the temporary memory location to the data structure address in step H8, and check asynchronous read process B14 will return to the caller, which is read processor B4.

If the read request flag is set indicating that data is available for transferring to the cache memory, check asynchronous read process B14 will determine whether the read request has been completed in step H10. If the read request is determined to have been completed, then check asynchronous read process B14 will direct control to step H8 for restoring the current cache information. If additional data is to be read by cache system 25A via the check asynchronous read process B14, it is next determined whether an error has occurred during the read process in step H12. If an error has occurred, the error count is incremented in step H18, and check asynchronous read process B14 determines whether the error count has exceeded the predetermined error count in step H20. If the predetermined error count has been exceeded, the outstanding read flags are cleared in step H24 and control is directed back to step H8 as previously discussed. If the predetermined error count has not been exceeded in step H20, the host end of file flag is set in step H22 and control is directed back to step H24 as previously discussed. The host end of file flag which is set in step H22 indicates that no additional data can be read from the network. This flag is set at this point and is later accessed by the read processor B4 in the read process as discussed previously (see FIGS. 10a–10b).

If no error occurred during the read process, check asynchronous read process B14 processes the network completed response via a standard network application program interface which process represents the standard housekeeping chores for processing a network response in step H14. If an error is detected in step H16, then the process is directed back to step H18 for incrementing the error count. If no error has been encountered by check asynchronous read process B14 in processing the network response, a confirmation is then transmitted to the network in step H26 and the number of bytes received from the network are determined in step H28. Thereafter, the transfer buffer process B18 is called in step H30 for transferring the data received in the cache memory to the application memory for access by application 15A.

Figure 13:
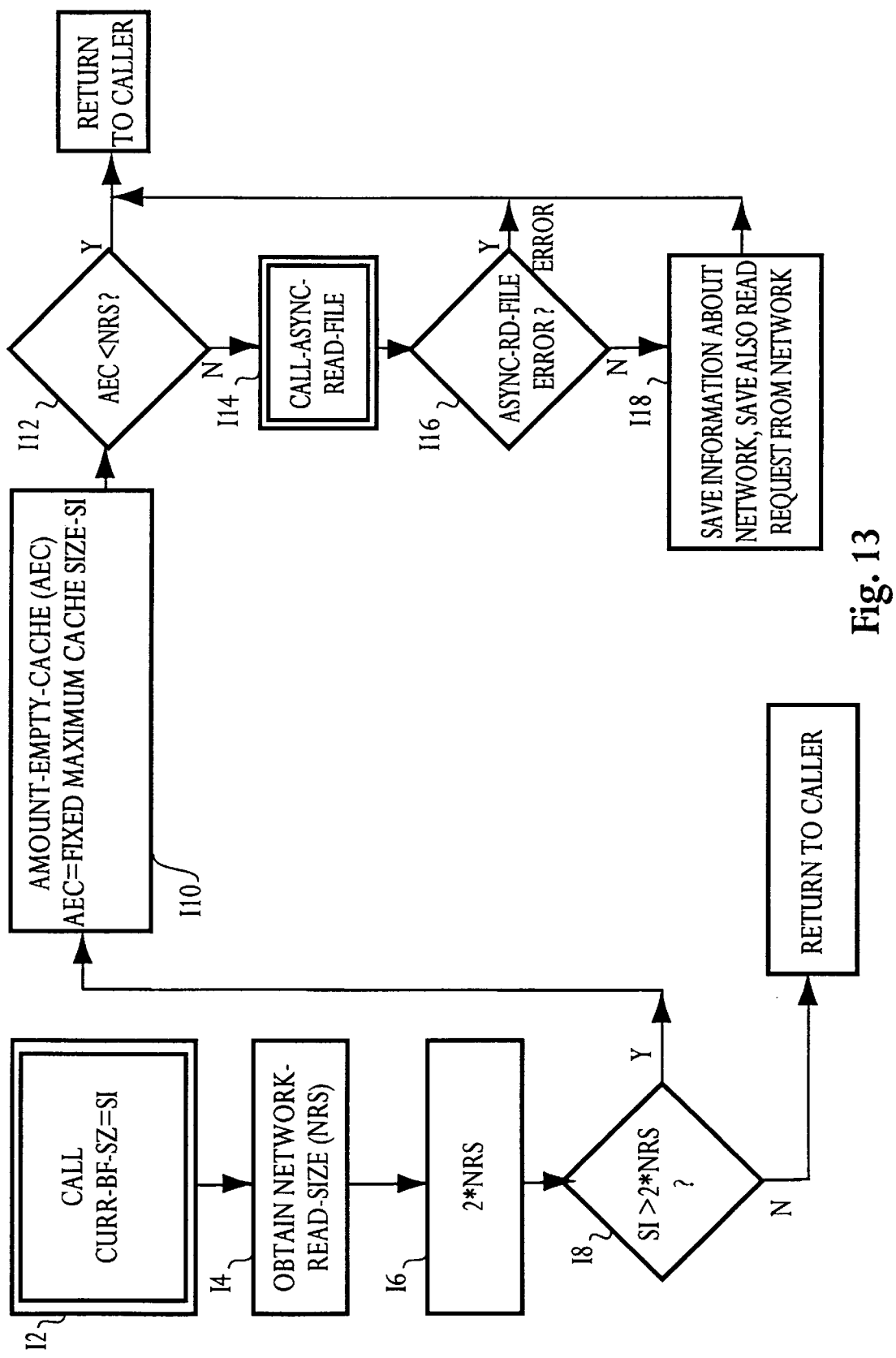

FIG. 13 is a detailed flow chart of the kick asynchronous read process performed by the cache system. In FIG. 13 kick asynchronous read process (kick-async-read) B20 first calls current buffer size process B24 to determine the amount of data in the cache memory in step I2. Kick asynchronous read process B20 then determines the network read size indicating how many bytes have already been read from the network in step I4. Kick asynchronous read process B20 calculates twice the network read side in step I6, and then determines whether the current buffer size is greater than two times the network read size in step I8 as a precaution against posting requests when Fill Buffer Process B16 will be called.

If the current buffer size is greater than two times the network read size in step I8, then the amount of room available in the cache is then calculated in step I10 to be the maximum cache size less the current amount of data in the cache. Kick asynchronous read process B20 then determines whether the amount of empty room in the cache is less than the network read size of the data to be received from the network in step I12. If there is insufficient empty room in the cache memory to receive the data, then kick asynchronous read process B20 returns to its caller, i.e., read processor B4.

If sufficient room is available in the cache memory, the asynchronous read file process (async-read-file) B26 is called in step I14. The asynchronous read file process is a standard process which posts the network read requests from cache system 25A to the network via network transport 35A. The specific implementation details of posting network read requests to a network may vary from network to network based upon the different network standard protocols, but are considered to be merely design details readily known to one of ordinary skill in the art. After the network read request has been posted to the network by cache system 25A, kick asynchronous read process B20 determines whether an error was encountered in step I16 by asynchronous read file process B26.

If an error has been encountered, for example, asynchronous read file process B26 was unable to successfully post a file read request to the network, then control is returned to read processor B4. If no error was encountered, the information regarding the network is saved for these specific read requests in step I18. This information which is saved regarding the network is later accessed by check asynchronous read process B14 when it is initiated or called by read processor B4 to process any outstanding network responses. Thus, this information indicates to check asynchronous read process B14 where the network read response is located and for which cache memory the read response is to be transmitted for access by the application memory and application 15A.

Figure 14:
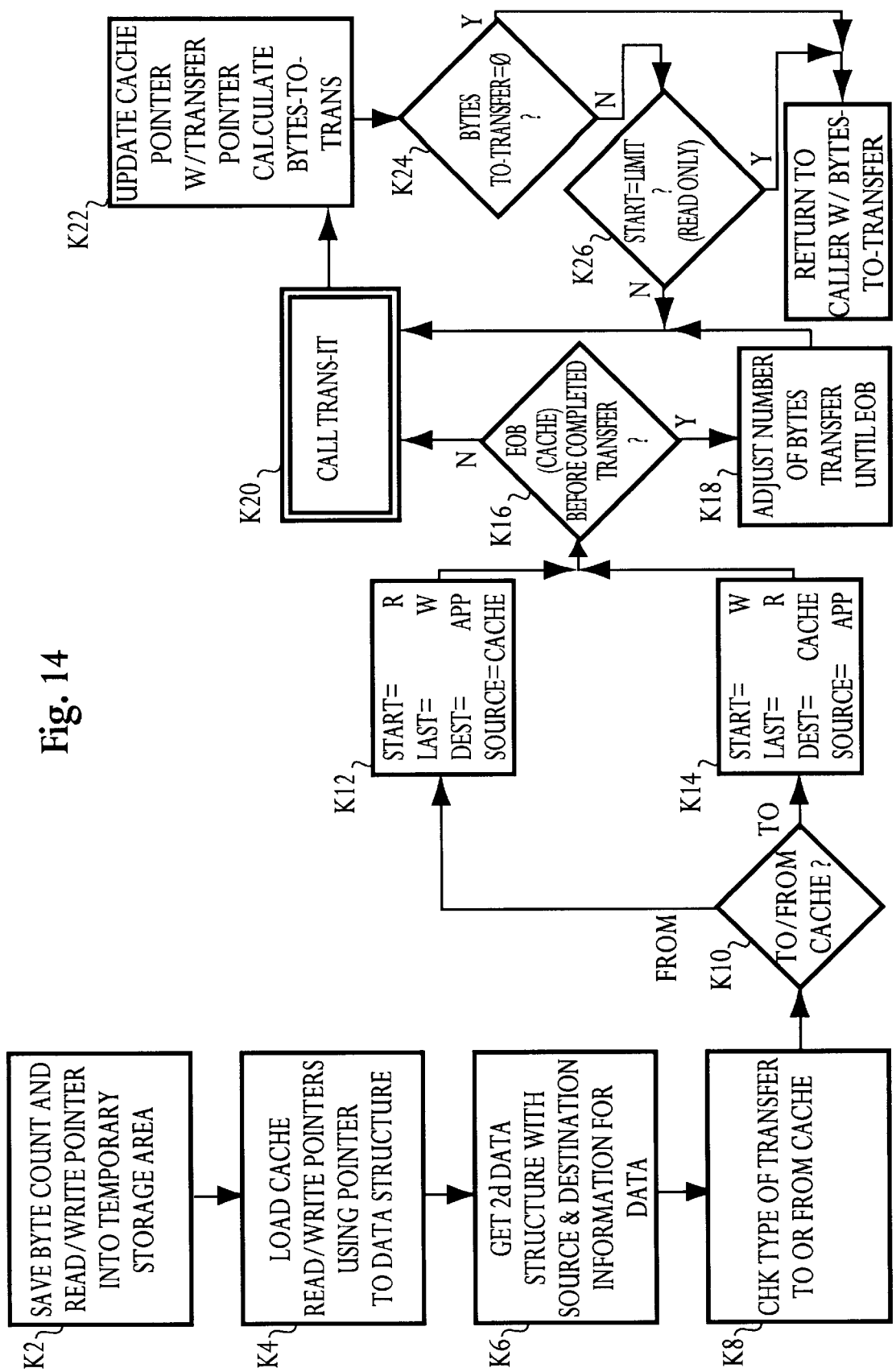

FIG. 14 is a detailed flow chart of the transfer buffer process in the cache system. As shown in FIG. 14, transfer buffer process (xfer-buff) B18 first saves the byte count and the application memory pointer to a temporary area in memory in step K2. The application memory pointer is altered via check asynchronous read process B14 when cache system 25A processes an outstanding network read request, or by fill buffer process B16 when the application and cache memories are low in data (see FIGS. 10a, 10b and 15). Transfer buffer process B18 next loads the cache read and write pointers into temporary memory from the data structure in step K4 as previously by read processor B4 and check asynchronous read process B14, and which was originally set up or initialized in open processor B10.

Transfer buffer process B18 next retrieves a second data structure with source and destination information for the data to be transferred in step K6. Transfer buffer process B18 then determines whether the transfer is to be from the cache memory to the application memory or the reverse in steps K8 and K10 by consulting or referring to the data structure. Transfer buffer process B18 sets the appropriate start, limit, destination and source variables in either step K12 or K14. For example, when the destination is to be the application memory and the source is cache memory, i.e., data is being transferred from the cache memory to the application memory, the start of the data which is transmitted is from the read pointer and completes at the write pointer in the cache memory since data is being transferred from the cache memory to the application memory as illustrated in step K12.

After the appropriate variables have been set in either step K12 or K14, transfer buffer process B18 then determines whether an end of buffer condition will be encountered before the completed transfer in step K16, i.e., whether the read or write pointer will have to be initialized back to the beginning of the cache memory during the selected transfer operation. If an end of buffer condition will be experienced, the number of bytes are adjusted to perform the transfer until the end of the cache memory in step K18. After it is determined that the end of buffer condition will not be experienced or after the number of bytes for transfer from the source to the destination are adjusted in steps K16 or K18, transfer buffer process B18 will call transit process B22 which is a standard process for transferring data between the cache and application memories.

As a result of the transit process B22 in step K20, the number of bytes which remain to fulfill the specific or outstanding read request are stored by transit process B22. Next, the cache memory pointer is updated with respect to the transfer pointer in the second data structure, the transfer pointer being whether data is to be transferred from cache memory to application memory or the reverse. The bytes to transfer pointer is then calculated by adding the number of bytes to be transferred to the current transfer position in step K22, and transfer buffer process B18 then determines whether the bytes to transfer equals zero in step K24. If the bytes to transfer equals zero, then no additional data needs to be transferred between the cache memory and the application memory and control is returned to the caller with bytes to transfer being zero.

If the bytes to transfer is not equal to zero, it is next determined whether the request is a read only request in step K26, and if so, the number of bytes to be transferred between the cache memory and application memory is returned to the caller. If the request is not a read only request, then control is returned to transit process B22 in step K20 to process other data for other read only requests. Thus, transfer buffer process B18 is used to transfer data between the application and cache memories when the cache memory is utilized by cache memory system 25A.

Figure 15:
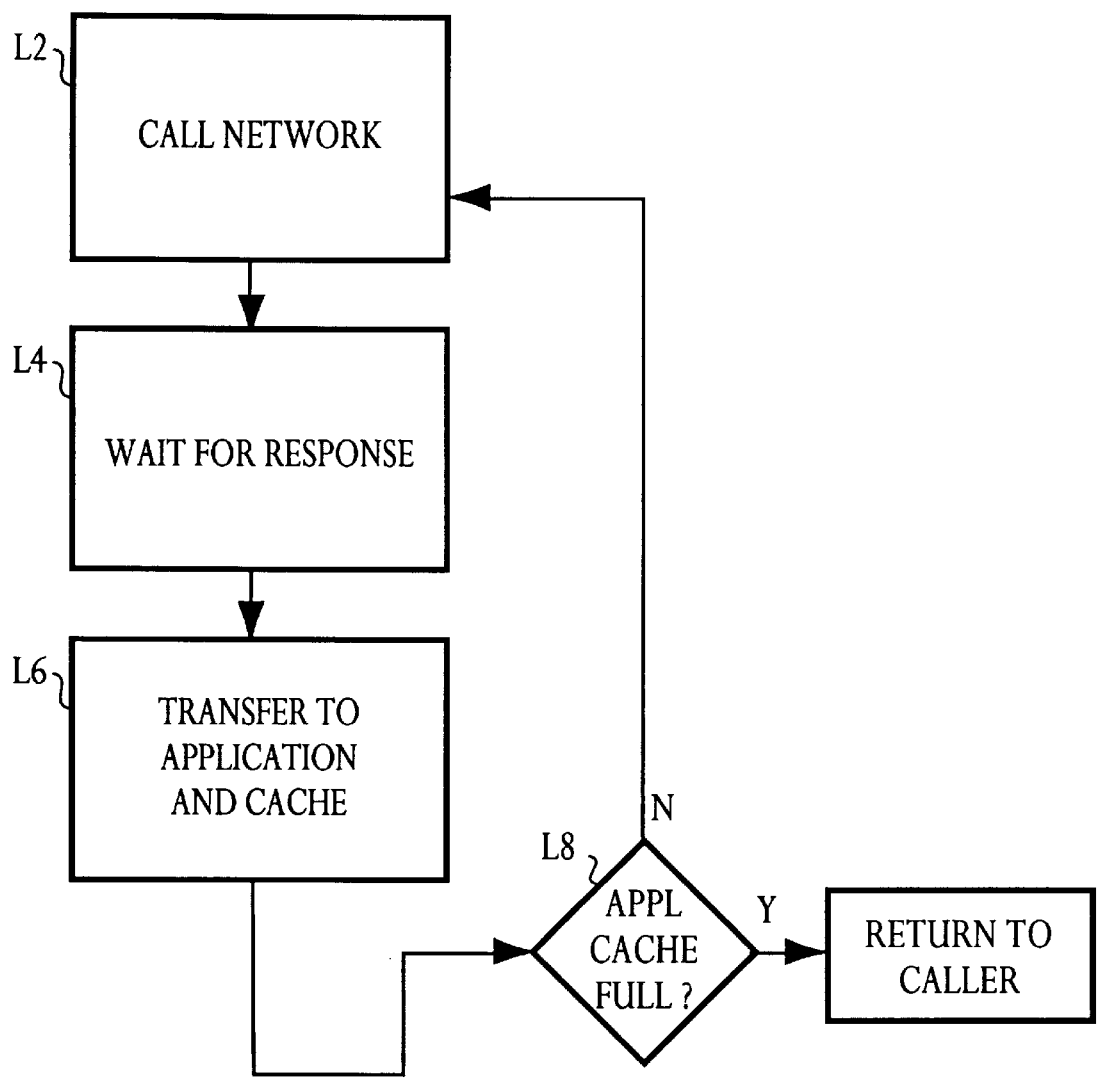

FIG. 15 is a detailed flow chart of the fill buffer process B16 (fill-buff) in the cache system. If FIG. 15, once fill buffer process B16 is called by read processor B4, the network is called with a read request for data in step L2, and fill buffer process B16 waits for the data response from the network in step L4. Once the data has been transmitted by the network and received by cache system 25A via fill buffer process B16, fill buffer process B16 will transfer the data first to the application memory, and if the application memory is full, fill buffer process B16 will transfer the received data to the cache memory in step L6. Fill buffer process B16 will next determine whether both the application and cache memories are full in step L8, and if not, will keep calling the network and transferring data to the application and cache memories until both memories are full.

Once both the application and cache memories are full, fill buffer process B16 will return control to read processor B4 for the standard read routine implemented by cache system 25A. Accordingly, fill buffer process B16 is utilized by read processor B4 when it is determined that the cache and application memories are substantially low in data and require immediate data to maintain the average transmission rate above the minimum required transmission rate.

Thus, cache system 25A provides two different types of network requests for obtaining data from the network. When there is no urgent need for data, cache system 25A posts a network request for data which does not wait or require a response from the network immediately. These types of network requests are utilized when cache system 25A determines that the cache memory is not being completely utilized, but contains sufficient data to maintain the average transmission rate above the required average transmission rate of data. However, if for some reason the cache and application memories become low in data, cache system 25A provides a second request which, assuming the network is functioning normally, will post a network request to the network and wait for the data to be received before posting any additional network requests. This dedicated or network response-dependent request will post data directly to the application memory first, and then continue to fill both the application and cache memories until both memories are full. In this manner, cache system 25A will attempt to refill the application and cache memories in order to return to the more preferred method of posting read requests to the network which does not require a network response and which does not lock up the application 15A until the network response is received.

Figure 16:
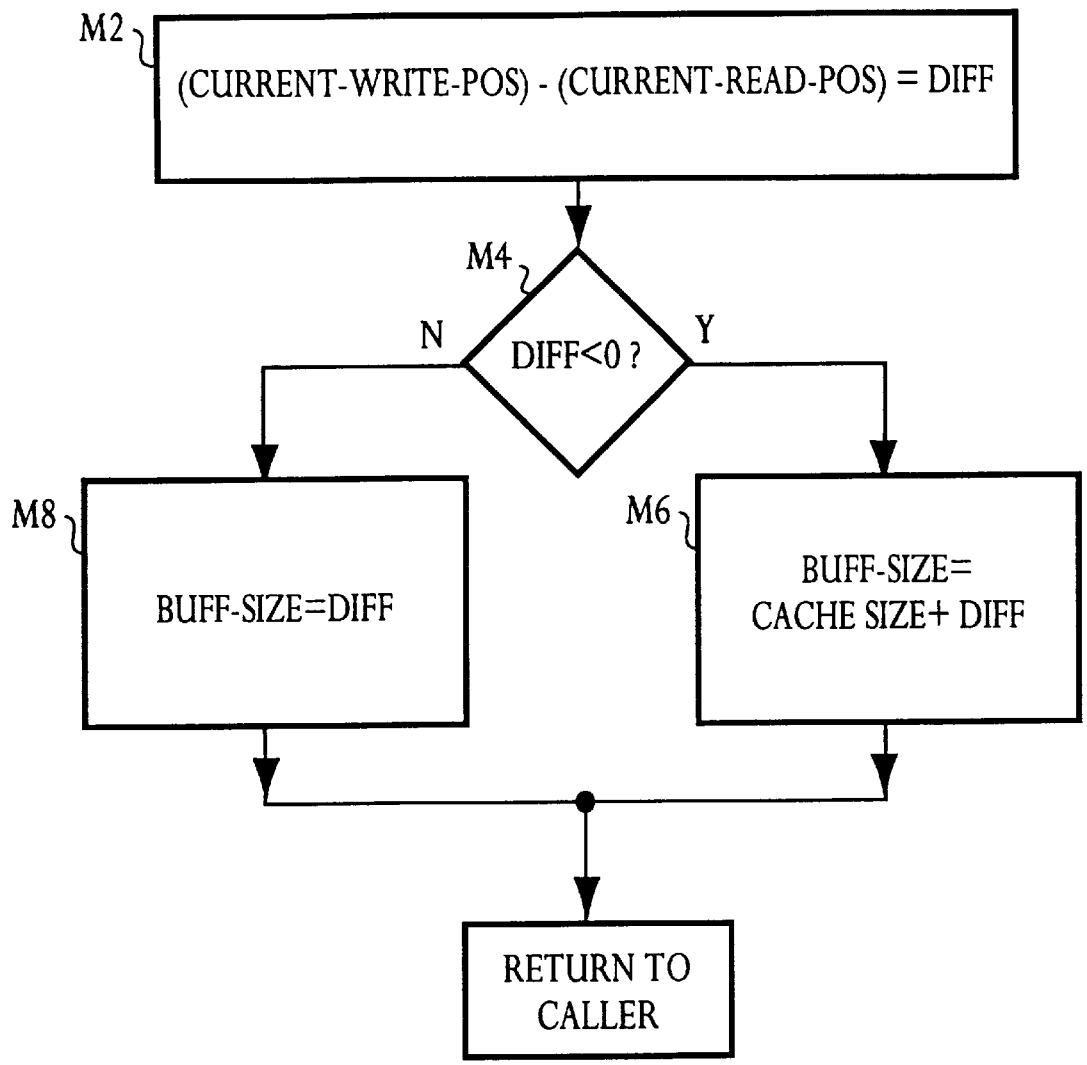

FIG. 16 is a detailed flow chart of the current buffer size process B24 (currt-buff-size) in the cache system. As illustrated in FIG. 16, when current buffer size process B24 is called by kick asynchronous read process B20, the current buffer size process B24 will calculate the amount of data in the cache memory. Current buffer size process B24 will first calculate the difference between the current write position and the current read position in step M2. If the difference is less than zero, i.e., the current read position follows the current write position, the current buffer size process B24 will calculate the buffer size as the above determined difference added to the cache memory size in step M6 and return this value to kick asynchronous read process B20.

If the difference between the current write position and the current read position is not less than zero in step M4, current buffer size process B24 will assign the current buffer size to be equal to the difference calculated in step M2, and return this current buffer size to kick asynchronous read process B20. Thus, current buffer size process B24 is flexible and is able to determine the current buffer size which contains data even though the different read and write pointers may be inverted depending on the different positions of the read and write pointers in the cache memory. The read and write pointers may occupy relatively different positions because of the nature of the cache memory, i.e., a linear memory which is constantly being written by the network and read to the application memory. Therefore, when the cache memory is emptied with respect to either or both the read and write pointers, the pointers will be reinitialized to the beginning of the cache memory for additional read or write operations.

Finally, it should be noted that while the above process was described with reference to FIGS. 3–16, in essence, the various steps of the present invention are performed in hardware. Accordingly, each step of the present invention typically generates a physical electrical signal which represents a physical result of a specific step described in the flow charts. The flow charts represent physical electrical signals which are generated and used in subsequent steps of the process. Therefore, the flow charts represent the transforming of physical electrical signals representing physical characteristics and quantities into other physical electrical signals also representing transformed physical characteristics.

Thus, the present invention provides various features described above which facilitates the transmission of data from a network system to a client system in a manner which maximizes the efficiency of data stored in the client system. For example, one of the features of the present invention is eliminating the problems of application "lock-up" by posting network read requests to the network system which do not require or wait for immediate responses from the network system. The data received from the network system is transmitted to the cache memory system. The cache memory system will transmit the data to the application memory. Therefore, the application does not prevent data from being received to the cache memory while the application is receiving data from the application memory.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A linear stream based cache system receiving data from a data source and transmitting the data to an application controlling a display for displaying the data, comprising:

an application memory storing first data;

a cache memory, operatively connected to said application memory, and storing second data; and a data processor, operatively connected to said application and cache memories, controlling the transmission of third data from the data source to the application via at least one of said application and cache memories responsive to an application file request, wherein when said data processor determines that a sufficient amount of at least one of the first and second data is stored in at least one of the application and cache memories, respectively, the application accesses the first data in said application memory and said data processor controls the transmission of the second data from the cache memory to the application memory, and controls the third data from the data source to the cache memory, and wherein when said data processor determines that the sufficient amount of at least one of the first and second data is not stored in at least one of the application and cache memories, respectively, the application accesses the first data in said application memory and said data processor controls the transmission of the second data from the cache memory to the application memory, and controls the third data from the data source to the application memory.

2. A linear stream based cache system according to claim 1, wherein said application and cache memories comprise a random access memory.

3. A linear stream based cache system according to claim 1, wherein the data source comprises a network.

4. A linear stream based cache system according to claim 1, further comprising a decoder operatively connected to the application, decoding at least one of the first, second and third data received from the application, and generating decoded data for display on the display.

5. A linear stream based cache system receiving data including at least one of voice data, video data, image data and digital data, from a data source and transmitting the data to an application controlling a display for displaying the data, comprising:

an application memory storing first data;

a cache memory, operatively connected to said application memory, and storing second data; and a data processor, operatively connected to said application and cache memories, controlling the transmission of third data from the data source to the application via at least one of said application and cache memories responsive to an application file request including one of open, close and read requests, said data processor receiving the application file request from the application, and requesting the third data from the data source without waiting for a data source response when a sufficient amount of at least one of the first and second data is stored in at least one of the application and cache memories, respectively.

6. A linear stream based cache system according to claim 5, wherein said application and cache memories comprise a random access memory.

7. A linear stream based cache system according to claim 5, wherein the data source comprises a network.

8. A linear stream based cache system according to claim 5, wherein said data processor further comprises means for requesting the third data from the data source and waiting for the data source response when the sufficient amount of at least one of the first and second data is not stored in at least one of the application and cache memories.

9. A linear stream based cache system
receiving data including at least one of voice data, video data, image data and digital data, from a data source and transmitting the data to an application controlling a display for displaying the data, comprising:

an application memory storing first data;

a cache memory, operatively connected to said application memory, and storing second data; and a data processor, operatively connected to said application and cache memories, controlling the transmission of third data from the data source to the application via at least one of said application and cache memories responsive to an application file request including one of open, close and read requests, said data processor receiving the application file request from the application, determining whether a sufficient amount of at least one of the first and second data is stored in at least one of the application and cache memories, respectively, posting a request for the third data from the data source without waiting for a data source response when said means for determining determines that the sufficient amount of data is stored, processing a data source response including the third data in response to the request posted by said means for posting and controlling the transmission of the third data from the data source to the cache memory, and from the cache memory to the application memory after the data source response is processed by said means for processing.

10. A linear stream based cache system according to claim 9, wherein the application receives data from the application memory during at least one of the posting of the request by said means for posting and the processing of the data source response by said means for processing.

11. A linear stream based cache system, according to claim 9, wherein the application file request further includes a seek request, wherein said data processor determines whether the application file request is first the read request, second the seek request and third one of the open and close requests.

12. A linear stream based cache system according to claim 9, wherein said application and cache memories comprise a random access memory.

13. A linear stream based cache system according to claim 9, wherein the data source comprises a network.

14. A method of receiving data including at least one of voice data, video data, image data and digital data, from a data source and transmitting the data to an application controlling a display for displaying the data, comprising the steps of:

(a) receiving an application file request from the application;

(b) determining whether a sufficient amount of at least one of first and second data is stored in at least one of application and cache memories, respectively;

(c) posting a request for third data from the data source without waiting for a data source response when said determining step (b) determines that the sufficient amount of data is stored;

(d) processing the data source response including the third data in response to the request posted by said posting step (c); and (e) controlling transmission of the third data from the data source to the cache memory, and from the cache memory to the application memory responsive to the data source response.

15. A method of seeking in a data file data including at least one of voice data, video data, image data and digital data, received from a data source and transmitted to an application controlling a display for displaying the data file, comprising the steps of:

(a) receiving a seek file request from the application;

(b) determining whether the seek file request is one of relative to beginning of file, relative to end of file and relative to current position in the video data file;

(c) normalizing the seek file request with respect to a reference point in the video data file;

(d) determining whether a sufficient amount of data is stored in at least one of application and cache memories;

(e) seeking to a new position in the data file responsive to the seek request when said determining step (d) determines that the sufficient amount of data is stored; and (f) requesting additional data from the data source for seeking to the new position in the data file when said determining step (d) determines that the sufficient amount of data is not stored.

16. A linear stream based cache system receiving data including at least one of voice data, video data, image data and digital data, from a data source and transmitting the data to an application controlling a display for displaying the data, comprising:

first memory means for storing first data;

second memory means for storing second data; and processor means for controlling the transmission of third data from the data source to the application via at least one of said first and second memory means responsive to an application file request including one of open, close and read requests, said processor means comprising:

means for receiving the application file request from the application; and means for requesting the third data from the data source without waiting for a data source response when a sufficient amount of at least one of the first and second data is stored in at least one of said first and second memory means, respectively.

17. A linear stream based cache system according to claim 16, wherein said first and second memory means comprise a random access memory.

18. A linear stream based cache system according to claim 16, wherein the data source comprises a network.

19. A linear stream based cache system according to claim 16, wherein said processor means further comprises means for requesting the third data from the data source and waiting for the data source response when the sufficient amount of at least one of the first and second data is not stored in at least one of the first and second memory means.

20. A linear stream based cache system receiving data from a data source and transmitting the data to an application controlling a display for displaying the data, comprising:

a network storing network data;

first means, operatively connected to said network, for storing first data;

second means, operatively connected to said first means and to said network, for storing second data; and processor means, operatively connected to said first and second means, controlling the transmission of network data from the network to the application via at least one of said first and second means responsive to an application file request, wherein when said processor means determines that a sufficient amount of at least one of the first and second data is stored in at least one of the first and second means respectively, the application accesses the first data in said first means and said processor means controls the transmission of the second data from the second means to the first means, and the network data from the network to the second means, and wherein when said processor means determines that the sufficient amount of at least one of the first and second data is not stored in at least one of the first and second means respectively, the application accesses the first data in said first means and said processor means controls the transmission of the second data from the second means to the first means, and the network data from the network to the first means.

21. A linear stream based cache system according to claim 20, wherein said application and cache memories comprise a random access memory.

22. A computer-implemented method of receiving data including at least one of voice data, video data, image data and digital data, from a data source and transmitting the data to an application controlling a display for displaying the data, comprising the steps of:

(a) receiving a first data message representing an application file request from the application;

(b) determining whether a sufficient amount of at least one of first and second data is stored in at least one of an application memory and a cache memory, respectively and generating a second data message in response thereto;

(c) transmitting a third data message representing a request for third data from the data source without waiting for a data source response when said determining step (b) generates the second data message indicating that the sufficient amount of data is stored;

(d) processing a fourth data message representing the data source response including the third data in response to the third data message transmitted by said transmitting step (c); and (e) controlling transmission of the fourth data message including the third data from the data source to the cache memory, and from the cache memory to the application memory responsive to the fourth data message representing the data source response being processed by said processing step (d).

23. A linear stream based cache system receiving streaming data including at least one of voice data, video data, image data and digital data, from a remotely located data server and transmitting the streaming data to an application on a client system controlling a display for displaying the data, including an application memory storing first streaming data; a cache memory, operatively connected to said application memory, and storing second streaming data; and a data processor, operatively connected to said application and cache memories, controlling the transmission of third streaming data from the remotely located data server to the application via at least one of said application and cache memories responsive to an application file request including one of open, close and read requests, said data processor receiving the application file request from the application, and requesting the third streaming data from the remotely located data server without waiting for a data server response when a sufficient amount of at least one of the first and second streaming data is stored in at least one of the application and cache memories, respectively.

24. A linear stream based cache system receiving continual data including at least one of voice data, video data, image data and digital data, from an external file server and transmitting the continual data to an application on a client system controlling a display for displaying the data, having an application memory storing first continual data; a cache memory, operatively connected to said application memory, and storing second continual data; and a data processor, operatively connected to said application and cache memories, controlling the transmission of third continual data from the external file server to the application via at least one of said application and cache memories responsive to an application file request including one of open, close and read requests, said data processor receiving the application file request from the application, and requesting the third continual data from the external file server without waiting for a server response when a sufficient amount of at least one of the first and second continual data is stored in at least one of the application and cache memories, respectively.

25. A method of receiving streaming data including at least one of voice data, video data, image data and digital data, from a data source and transmitting the streaming data to an application controlling a display for displaying the streaming data, comprising the steps of:

(a) receiving an application file request from the application;

(b) determining whether a sufficient amount of at least one of first and second streaming data is stored in at least one of application and cache memories, respectively;

(c) posting a request for third streaming data from the data source without waiting for a data source response when said determining step (b) determines that the sufficient amount of streaming data is stored;

(d) processing the data source response including the third streaming data in response to the request posted by said posting step (c); and (e) controlling transmission of the third streaming data from the data source to the cache memory, and from the cache memory to the application memory after the data source response is processed by said processing step (d).

26. A linear stream based cache system receiving streaming data including at least one of voice data, video data, image data and digital data, from a remotely located data server via a data server network and transmitting the streaming data to an application on a client system controlling a display for displaying the data, including an application memory storing first streaming data; a cache memory, operatively connected to said application memory, and storing second streaming data; and a data processor, operatively connected to said application and cache memories, controlling the transmission of third streaming data from the remotely located data server to the application via at least one of said application and cache memories responsive to an application file request including one of open, close and read requests, said data processor receiving the application file request from the application, and requesting the third streaming data from the remotely located data server without waiting for a data server response when a sufficient amount of at least one of the first and second streaming data is stored in at least one of the application and cache memories, respectively.

27. A linear stream based cache system receiving continual data including at least one of voice data, video data, image data and digital data, from an external file server via an external file server network and transmitting the continual data to an application on a client system controlling a display for displaying the data, having an application memory storing first continual data; a cache memory, operatively connected to said application memory, and storing second continual data; and a data processor, operatively connected to said application and cache memories, controlling the transmission of third continual data from the external file server to the application via at least one of said application and cache memories responsive to an application file request including one of open, close and read requests, said data processor receiving the application file request from the application, and requesting the third continual data from the external file server without waiting for a server response when a sufficient amount of at least one of the first and second continual data is stored in at least one of the application and cache memories, respectively.

28. A method of receiving streaming data including at least one of voice data, video data, image data and digital data, from a data source via a data source network and transmitting the streaming data to an application controlling a display for displaying the streaming data, comprising the steps of:

(a) receiving an application file request from the application;

(b) determining whether a sufficient amount of at least one of first and second streaming data is stored in at least one of application and cache memories, respectively;

(c) posting a request for third streaming data from the data source without waiting for a data source response when said determining step (b) determines that the sufficient amount of streaming data is stored;

(d) processing the data source response including the third streaming data in response to the request posted by said posting step (c); and (e) controlling transmission of the third streaming data from the data source to the cache memory, and from the cache memory to the application memory after the data source response is processed by said processing step (d).

29. A linear stream based cache system receiving continual data including at least one of voice data, video data, image data and digital data, from an external file server via a request from another external file server and transmitting the continual data to an application on a client system controlling a display for displaying the data, having an application memory storing first continual data; a cache memory, operatively connected to said application memory, and storing second continual data; and a data processor, operatively connected to said application and cache memories, controlling the transmission of third continual data from the external file server to the application via at least one of said application and cache memories responsive to an application file request including one of open, close and read requests, said data processor receiving the application file request from the application, and requesting the third continual data from the external file server without waiting for a server response when a sufficient amount of at least one of the first and second continual data is stored in at least one of the application and cache memories, respectively.

30. A method of receiving streaming data including at least one of voice data, video data, image data and digital data, from a data source via a request from another data source and an associated another data source network and transmitting the streaming data to an application controlling a display for displaying the streaming data, comprising the steps of:

(a) receiving an application file request from the application;

(b) determining whether a sufficient amount of at least one of first and second streaming data is stored in at least one of application and cache memories, respectively;

(c) posting a request for third streaming data from the data source without waiting for a data source response when said determining step (b) determines that the sufficient amount of streaming data is stored;

(d) processing the data source response including the third streaming data in response to the request posted by said posting step (c); and (e) controlling transmission of the third streaming data from the data source to the cache memory, and from the cache memory to the application memory after the data source response is processed by said processing step (d).

31. A linear stream based cache system receiving time encoded data from an external file server and transmitting the time encoded data to an application on a client system controlling a display for displaying the data, having an application memory storing first data; a cache memory, operatively connected to said application memory, and storing second data; and a data processor, operatively connected to said application and cache memories, controlling the transmission of third data from the external file server to the application via at least one of said application and cache memories responsive to an application file request including one of open, close and read requests, said data processor receiving the application file request from the application, and requesting the third data from the external file server without waiting for a server response when a sufficient amount of at least one of the first and second data is stored in at least one of the application and cache memories, respectively.

32. A method of receiving data including at least one of voice data, video data, image data and digital data, from a data source and transmitting the data to an application controlling a display for displaying the data, comprising the steps of:

(a) a step for receiving an application file request from the application;

(b) a step for determining whether a sufficient amount of at least one of first and second data is stored in at least one of application and cache memories, respectively;

(c) a step for posting a request for third data from the data source without waiting for a data source response when said determining step (b) determines that the sufficient amount of data is stored;

(d) a step for processing the data source response including the third data in response to the request posted by said posting step (c); and (e) a step for controlling transmission of the third data from the data source to the cache memory, and from the cache memory to the application memory responsive to the data source response.

* * * * *